(12) United States Patent
Taylor-Tibbott et al.

(10) Patent No.: US 12,358,635 B2
(45) Date of Patent: Jul. 15, 2025

(54) INLET ASSEMBLY

(71) Applicant: ROLLS-ROYCE plc, London (GB)

(72) Inventors: Oliver C. Taylor-Tibbott, Lichfield (GB); Zahid M. Hussain, Derby (GB); Ainhoa Aguado San Millan, Derby (GB)

(73) Assignee: ROLLS-RPYCE plc, London (GB)

( * ) Notice: Subject to any disclaimer, the term of this patent is extended or adjusted under 35 U.S.C. 154(b) by 0 days.

(21) Appl. No.: 18/359,361

(22) Filed: Jul. 26, 2023

(65) Prior Publication Data
US 2024/0059420 A1     Feb. 22, 2024

(30) Foreign Application Priority Data
Aug. 16, 2022  (GB) ..................................... 2211928

(51) Int. Cl.
  *F02C 7/04*   (2006.01)
  *B64D 33/02*  (2006.01)
  *F02C 7/18*   (2006.01)

(52) U.S. Cl.
  CPC ................ B64D 33/02 (2013.01); *F02C 7/04* (2013.01); *F02C 7/18* (2013.01)

(58) Field of Classification Search
  CPC .... F02C 7/04; F02C 7/05; F02C 7/055; F02C 7/18; F02C 7/185; F02K 3/105; F02K 3/115; F05D 2260/30; F05D 2260/31; F05D 2260/33
  See application file for complete search history.

(56) References Cited

U.S. PATENT DOCUMENTS

| 2,553,512 | A | 5/1951 | Cotton, Jr. |
| 7,717,667 | B2* | 5/2010 | Urbassik ................. F01D 11/14 415/1 |
| 2010/0307442 | A1 | 12/2010 | Bolender et al. |
| 2012/0015596 | A1 | 1/2012 | Fang et al. |

OTHER PUBLICATIONS

Great Britain search report issued in GB Patent Application No. 2211928.3 dated Feb. 9, 2023.
European search report dated Dec. 6, 2023 issued in EP 23185737.6.

* cited by examiner

*Primary Examiner* — Devon C Kramer
*Assistant Examiner* — Sean V Meiller

(57) ABSTRACT

An inlet assembly includes a web extending between a first end and a second end along a first axis. The web includes first and second major surfaces. The inlet assembly includes a load transfer flange at least partially disposed around the web and configured to be fixedly coupled to a gas turbine engine. The inlet assembly includes first vanes spaced apart from each other at least along the first axis. Each first vane extends between the first major surface of the web and the load transfer flange. The inlet assembly includes second vanes spaced apart from each other at least along the first axis. Each second vane extends between the second major surface of the web and the load transfer flange.

5 Claims, 17 Drawing Sheets

INLET ASSEMBLY

CROSS-REFERENCE TO RELATED APPLICATIONS

This specification is based upon and claims the benefit of priority from United Kingdom patent application number GB 2211928.3 filed on Aug. 16, 2022, the entire contents of which is incorporated herein by reference.

BACKGROUND

Technical Field

The present disclosure relates to an inlet assembly, and in particular to an inlet assembly for a gas turbine engine.

Description of the Related Art

Gas turbine engines may include an engine core and a nacelle that together define a bypass duct. Typically, such gas turbine engines employ cooling assemblies, for example, turbine case cooling (TCC) assemblies, to vent air flowing in the bypass duct into the engine core to cool downstream components of the engine core. In some cases, the air from the bypass duct may help to maintain a desired temperature of the downstream components and/or to control thermal expansion of the downstream components. The cooling assemblies typically, but not exclusively, take the air from the bypass duct in through inlet assemblies mounted on the bypass duct (e.g., an inner barrel of the bypass duct) and duct it to the downstream components.

Typically, the inner barrel may be required to be reinforced in order to cope with engine loads and to support the cooling assemblies, for example, the inlet assemblies mounted on the inner barrel. In some cases, extra parts and/or materials may be required to reinforce a supporting structure, e.g., the inner barrel. This may increase an overall mass of the gas turbine engine and may further increase a cost of the gas turbine engine due to the extra parts and/or the materials.

SUMMARY

The present disclosure describes an inlet assembly for a gas turbine engine which seeks to overcome some or all of the above problems.

In a first aspect, there is provided an inlet assembly for a gas turbine engine. The inlet assembly includes a web extending between a first end and a second end along a first axis. The web includes a first major surface and a second major surface opposite to the first major surface. Each of the first major surface and the second major surface extends at least along the first axis and a second axis orthogonal to the first axis. The inlet assembly further includes a load transfer flange at least partially disposed around the web and configured to be fixedly coupled to the gas turbine engine. The inlet assembly further includes a plurality of first vanes spaced apart from each other at least along the first axis and defining a plurality of first inlet passages therebetween. Each first vane from the plurality of first vanes extends between the first major surface of the web and the load transfer flange at least along a third axis orthogonal to each of the first axis and the second axis. Each first vane is fixedly coupled to the web and the load transfer flange. The inlet assembly further includes a plurality of second vanes spaced apart from each other at least along the first axis and defining a plurality of second inlet passages therebetween. Each second vane from the plurality of second vanes extends between the second major surface of the web and the load transfer flange at least along the third axis. Each second vane is fixedly coupled to the web and the load transfer flange.

The air flowing in the bypass duct typically has a temperature below 100° C. In some cases, the air from the bypass duct may help to maintain a desired temperature and/or acceptable thermal limits of the downstream components, and/or to control thermal expansion of the downstream components. The cooling assemblies typically take the air from the bypass duct in through inlet assemblies mounted on a surface (e.g., a surface of an inner barrel) of the gas turbine engine and duct it to the engine core, a turbine section, air to fluid coolers, oil pumps or fuel pumps, and/or components of cabin bleed systems, such as regulating valves or bypass heat exchangers.

Advantageously, the web and the load transfer flange of the inlet assembly of the present disclosure may provide a structural reinforcement to the surface to which the inlet assembly is coupled. Specifically, the web and the load transfer flange may provide a structural load path to the surface. The web may further position, restrict movement, and/or support the plurality of first vanes and the plurality of second vanes. Moreover, the web disposed between the plurality of first vanes and the plurality of second vanes may prevent twisting of the plurality of first vanes and the plurality of second vanes due to any loads applied on the plurality of first vanes and/or the plurality of second vanes. The load transfer flange may be configured to distribute any load applied to the inlet assembly (for example, any load applied on the web, the plurality of first vanes, and/or the plurality of second vanes) over a large area of the surface to which the inlet assembly is coupled. Therefore, the surface may not require additional components and/or materials that may be conventionally required to reinforce the surface to which to the inlet assembly is mounted. This may decrease an overall mass of the gas turbine engine and may further decrease a cost of the gas turbine engine.

Moreover, since the inlet assembly may provide an enhanced structural reinforcement, lightweight and/or low-cost materials may be used to manufacture one or more components of the inlet assembly. This may further decrease the overall mass of the gas turbine engine and/or decrease the cost of the gas turbine engine.

In an example, one or more components of the inlet assembly may be formed by an additive manufacturing process. For example, the additive manufacturing process may include additive layer manufacturing (ALM). The ALM may include selective laser melting, electron beam melting, blown powder deposition, or equivalent alternative ALM processes. The overall size, shape, and material of the one or more components may therefore be varied conveniently using ALM as per application requirements, for example, stiffness and/or hardness requirements. This may also reduce manufacturing costs of the inlet assembly of the present disclosure. In another example, one or more components of the inlet assembly may be formed by a moulding process, such as an injection moulding process.

Since the one or more components may be separately manufactured and assembled to form the inlet assembly, the inlet assembly may have an improved repairability.

In some embodiments, the inlet assembly includes a first support structure and a second support structure. The first support structure is disposed opposite to the first major surface of the web and connected to each first vane. The first support structure couples each first vane to the load transfer flange. The second support structure is disposed opposite to the second major surface of the web and connected to each second vane. The second support structure couples each second vane to the load transfer flange.

Therefore, the first support structure may transfer, via the load transfer flange, any loads applied on the plurality of first vanes to the surface to which the inlet assembly is coupled. Similarly, the second support structure may also transfer, via the load transfer flange, any loads applied on the plurality of second vanes to the surface.

In some embodiments, the first support structure includes a first plate opposing the first major surface of the web and connected to each first vane, and a first flange connected to the first plate and extending from the first plate opposite to the first major surface. The first flange couples each first vane to the load transfer flange. In some embodiments, the second support structure includes a second plate opposing the second major surface of the web and connected to each second vane, and a second flange connected to the second plate and extending from the second plate opposite to the second major surface. The second flange couples each second vane to the load transfer flange.

In some embodiments, the first support structure includes a first foremost flange coupling the first plate to the load transfer flange, and a first rearmost flange spaced apart from the first foremost flange along the first axis and coupling the first plate to the load transfer flange. In some embodiments, the second support structure includes a second foremost flange spaced apart from the first foremost flange along the third axis and coupling the second plate to the load transfer flange, and a second rearmost flange spaced apart from the first rearmost flange along the third axis and coupling the second plate to the load transfer flange.

Therefore, the first foremost flange and the first rearmost flange may also transfer, via the load transfer flange, any loads applied on the plurality of first vanes to the surface to which the inlet assembly is coupled. Similarly, the second foremost flange and the second rearmost flange may also transfer any loads applied on the plurality of second vanes to the surface.

In some embodiments, the first plate defines a plurality of first openings and the first flange includes a plurality of first projections corresponding to the plurality of first openings, such that each of the plurality of first openings at least partially receives a corresponding first projection from the plurality of first projections therein to connect the first flange to the first plate. The second plate defines a plurality of second openings and the second flange includes a plurality of second projections corresponding to the plurality of second openings, such that each of the plurality of second openings at least partially receives a corresponding second projection from the plurality of second projections therein to connect the second flange to the second plate.

Therefore, the first flange of the first support structure may transfer, via the load transfer flange, any loads applied on the plurality of first vanes to the surface to which the inlet assembly is coupled. Similarly, the second flange of the second support structure may transfer, via the load transfer flange, any loads applied on the plurality of second vanes to the surface. Further, since in some cases, each of the first support structure and the second support structure may not be formed as a single component, the first support structure and the second support structure may be formed conveniently using the additive manufacturing process. This may also reduce manufacturing costs of the inlet assembly. Moreover, the overall size, shape, and material of the first support structure and the second support structure may be varied conveniently using ALM as per application requirements. This may also improve the repairability of the inlet assembly.

In some embodiments, the plurality of first openings extends along a first line obliquely inclined to the first axis and the plurality of second openings extends along a second line obliquely inclined to the first axis.

Therefore, the plurality of first vanes may be staggered relative to each other when the inlet assembly is coupled to the surface due to arrangement along the first line. Similarly, the plurality of second vanes may be staggered relative to each other when the inlet assembly is coupled to the surface due to arrangement along the second line. The extent of stagger of the plurality of first vanes and the plurality of second vanes may be controlled by the first and second inclination angles, respectively. The values of the first and second inclination angles may be based on application requirements, for example, a shape of the surface to which the inlet assembly is coupled.

In some embodiments, the web further includes a foremost flange and a rearmost flange. The foremost flange is disposed proximal to the first end and couples the web to the load transfer flange. The rearmost flange is disposed proximal to the second end and couples the web to the load transfer flange.

Therefore, the foremost flange and the rearmost flange may transfer, via the load transfer flange, any loads applied on the web to the surface to which the inlet assembly is coupled. Further, the foremost flange and the rearmost flange may transfer, via the load transfer flange, any loads applied on the plurality of first vanes and/or the plurality of second vanes, which are coupled to the web, to the surface.

In some embodiments, the load transfer flange defines a plurality of first apertures extending therethrough. Further, each of the first foremost flange, the first rearmost flange, the second foremost flange, the second rearmost flange, the first flange, the second flange, the foremost flange, and the rearmost flange defines a plurality of second apertures extending therethrough and aligned with at least some of the plurality of first apertures for at least partially receiving corresponding fasteners therein.

Therefore, the web and the load transfer flange coupled to the plurality of first vanes and the plurality of second vanes may provide the structural load path to the surface to which the inlet assembly is coupled. Further, since the web, the plurality of first vanes, and the plurality of second vanes are coupled to the load transfer flange via the fasteners, the web, the plurality of first vanes, and/or the plurality of second vanes may be easily replaced in case of any damage. This may further enhance the repairability of the inlet assembly.

In some embodiments, each of the first foremost flange, the first rearmost flange, the second foremost flange, the second rearmost flange, the first flange, the second flange, the foremost flange, and the rearmost flange includes a plurality of inserts corresponding to the plurality of second apertures. Each insert from the plurality of inserts is at least partially received in a corresponding first aperture from the plurality of second apertures. A material of each insert is different from a material of each of the first foremost flange, the first rearmost flange, the second foremost flange, the second rearmost flange, the first flange, the second flange, the foremost flange, and the rearmost flange.

For example, in some cases, the material of the plurality of inserts may be stronger (e.g., stiffer and/or harder) than the material of each of the first foremost flange, the first rearmost flange, the second foremost flange, the second rearmost flange, the first flange, the second flange, the foremost flange, and the rearmost flange. In some cases, the material of the plurality of inserts may control variation in the size of the second apertures due to the thermal expansion. The plurality of inserts may also prevent cracking of the each of the first foremost flange, the first rearmost flange, the second foremost flange, the second rearmost flange, the first flange, the second flange, the foremost flange, and the rearmost flange proximal to the plurality of second apertures upon receiving the corresponding fasteners therein.

In some embodiments, each first vane at least partially defines a first cavity therein. The first cavity faces the first major surface. Each second vane at least partially defines a second cavity therein. The second cavity faces the second major surface. The web further includes a plurality of first protrusions corresponding to the plurality of first vanes and extending from the first major surface of the web toward the plurality of first vanes. Each first protrusion from the plurality of first protrusions is at least partially received within the first cavity of a corresponding first vane from the plurality of first vanes. The web further includes a plurality of second protrusions corresponding to the plurality of second vanes and extending from the second major surface of the web toward the plurality of second vanes. Each second protrusion from the plurality of second protrusions is at least partially received within the second cavity of a corresponding second vane from the plurality of second vanes.

In some embodiments, each first vane at least partially defines a first cavity therein. The first cavity faces the first major surface. Further, each second vane at least partially defines a second cavity therein. The second cavity faces the second major surface. The inlet assembly further includes a plurality of first pins and a plurality of second pins. Each first pin from the plurality of first pins is connected to and extends from the first major surface of the web. Each first pin is at least partially received within and engages the first cavity of the corresponding first vane, such that each first pin is coupled to the first cavity of the corresponding first vane. Each second pin from the plurality of second pins is connected to and extends from the second major surface the web. Each second pin is at least partially received within and engages the second cavity of the corresponding first vane, such that each second pin is coupled to the second cavity of the corresponding second vane.

In some embodiments, the web further includes a plurality of openings extending therethrough from the first major surface to the second major surface. Each first vane is at least partially received within a corresponding opening from the plurality of openings of the web, and an opposing second vane from the plurality of second vanes is at least partially received within the corresponding opening.

In some embodiments, each first vane further includes a pair of first projections defining a first opening therebetween. Each second vane includes a second projection. The pair of first projections of each first vane is at least partially received within the corresponding opening of the web. The second projection of the opposing second vane is at least partially received within the corresponding opening of the web. The second projection is at least partially received within the first opening.

In some embodiments, each first vane further includes a first projection. Each second vane further includes a second projection. The first projection of each first vane is at least partially received within the corresponding opening of the web. The second projection of the opposing second vane is at least partially received within the corresponding opening of the web. The first projection is offset from the second projection relative to the second axis, such that the first projection at least partially and slidably engages the second projection.

Thus, the plurality of first vanes and the plurality of second vanes may be securely coupled to the web as intended, such that the plurality of first vanes and the plurality of second vanes have restricted movement, and/or are well-supported by the web.

In some embodiments, the inlet assembly further includes a plurality of positioning features disposed adjacent to the web. The plurality of positioning features extends from each first vane and/or each second vane.

The plurality of positioning features may ensure that each first vane and/or each second vane is received within the corresponding opening of the web as intended. For example, the plurality of positioning features may ensure that each first vane and/or each second vane are received within the corresponding opening in a correct orientation. The plurality of positioning features may further assist to position, restrict movement, and/or support the plurality of first vanes and/or the plurality of second vanes.

In some embodiments, the load transfer flange includes a first end portion extending at least along the third axis, a second end portion extending at least along the third axis and spaced apart from the first end portion at least along the first axis, a first lateral portion extending from the first end portion to the second end portion, and a second lateral portion extending from the first end portion to the second end portion and spaced apart from the first lateral portion at least along the third axis. The first end portion is proximal to an adjacent first vane from the plurality of first vanes and an adjacent second vane from the plurality of second vanes. The second end portion is proximal to an adjacent first vane from the plurality of first vanes and an adjacent second vane from the plurality of second vanes. The first lateral portion is coupled to each first vane and the second lateral portion is coupled to each second vane.

In some embodiments, the first foremost flange and the second foremost flange are coupled to the first end portion of the load transfer flange, the first rearmost flange and the second rearmost flange are coupled to the second end portion of the load transfer flange, the first flange is coupled to the first lateral portion of the load transfer flange, and the second flange is coupled to the second lateral portion of the load transfer flange.

In a second aspect, there is provided a gas turbine engine. The gas turbine engine includes an engine core including a compressor, a combustor, a turbine, and a core shaft connecting the turbine to the compressor. The gas turbine engine further includes a fan located upstream of the engine core. The fan generates a core airflow which enters the engine core and a bypass airflow which flows through a bypass duct surrounding the engine core. The gas turbine engine further includes an inner ring defining a radially inner surface of the bypass duct and an inner cowl providing an aerodynamic fairing surrounding the engine core. The inner cowl is rearwards of and axially spaced from the inner ring. The gas turbine engine further includes an inner barrel surrounding the engine core and bridging the inner ring and the inner cowl. The gas turbine engine further includes the inlet assembly of the first aspect mounted to the bypass duct or the inner barrel, such that the load transfer flange is fixedly coupled to the bypass duct or the inner barrel.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

As used herein, the term "configured to" and like is at least as restrictive as the term "adapted to" and requires actual design intention to perform the specified function rather than mere physical capability of performing such a function.

As used herein, the terms "first", "second" and "third" are used as identifiers. Therefore, such terms should not be construed as limiting of this disclosure. The terms "first", "second" and "third", when used in conjunction with a feature or an element can be interchanged throughout the embodiments of this disclosure.

As used herein, "at least one of A and B" should be understood to mean "only A, only B, or both A and B".

As used herein, the term "at least partially" refers to any percentage greater than 1%. In other words, the term "at least partially" refers to any amount of a whole. For example, "at least partially" may refer to a small portion, half, or a selected portion of a whole. In some cases, "at least partially" may refer to a whole amount. The term "partially" refers to any percentage less than 100%.

As used herein, the term "fixedly coupled" refers to two or more elements being attached to each other so that they are not intended to be separated or disconnected during normal use.

As used herein, the term "spaced apart" refers to elements that are disposed at a distance from one another. A plurality of elements spaced apart from each other means that adjacent elements from the plurality of elements are disposed at a distance from one another. A plurality of elements at least partially spaced apart from each other means that at least portions of adjacent elements from the plurality of elements are disposed at a distance from one another.

The terms "inboard end" and "outboard end" of a component are defined with respect to a rotational axis. The inboard end is closer to the rotational axis as compared to the outboard end. Therefore, the inboard end corresponds to a radially inner end of the component relative to the rotational axis, while the outboard end corresponds to a radially outer end of the component relative to the rotational axis.

Figure 1:
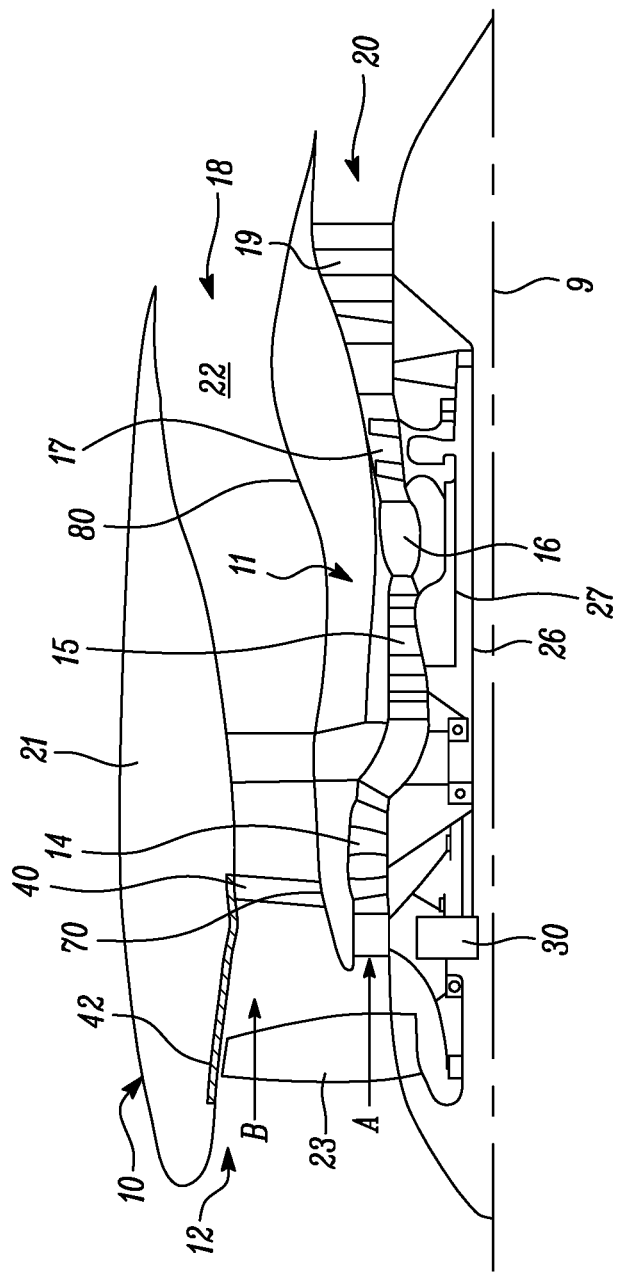
FIG. 1 is a sectional side view of a gas turbine engine.

FIG. 1 illustrates a gas turbine engine 10 having a principal rotational axis 9. The gas turbine engine 10 comprises an air intake 12 and a propulsive fan 23 that generates two airflows: a core airflow A and a bypass airflow B. The gas turbine engine 10 comprises an engine core 11 that receives the core airflow A. In other words, the core airflow A enters the engine core 11. The fan 23 is located upstream of the engine core 11. The engine core 11 comprises, in axial flow series, a compressor, a combustor, and a turbine. Specifically, the engine core 11 comprises, in axial flow series, a low pressure compressor 14, a high pressure compressor 15, a combustor 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22 surrounding the engine core 11. The bypass airflow B flows through the bypass duct 22, where it is straightened by a row of outer guide vanes 40 before exiting the bypass exhaust nozzle 18. The outer guide vanes 40 extend radially outwardly from an inner ring 70 which defines a radially inner surface of the bypass duct 22. Rearward of the outer guide vanes 40, the engine core 11 is surrounded by an inner cowl 80 which provides an aerodynamic fairing defining an inner surface of the bypass duct 22. The inner cowl 80 is rearwards of and axially spaced from the inner ring 70. A fan case 42 defines an outer surface of the bypass duct 22. The inner ring 70 defines the inner surface of the bypass duct 22 towards the rear of the fan case 42. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustor 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. A core shaft 27 connects the turbine 17, 19 to the compressor 14, 15. Specifically, the high pressure turbine 17 drives the high pressure compressor 15 by the suitable core shaft 27 or an interconnecting shaft. The fan 23 generally provides the majority of the propulsive thrust. The epicyclic gearbox 30 is a reduction gearbox.

Figure 2:
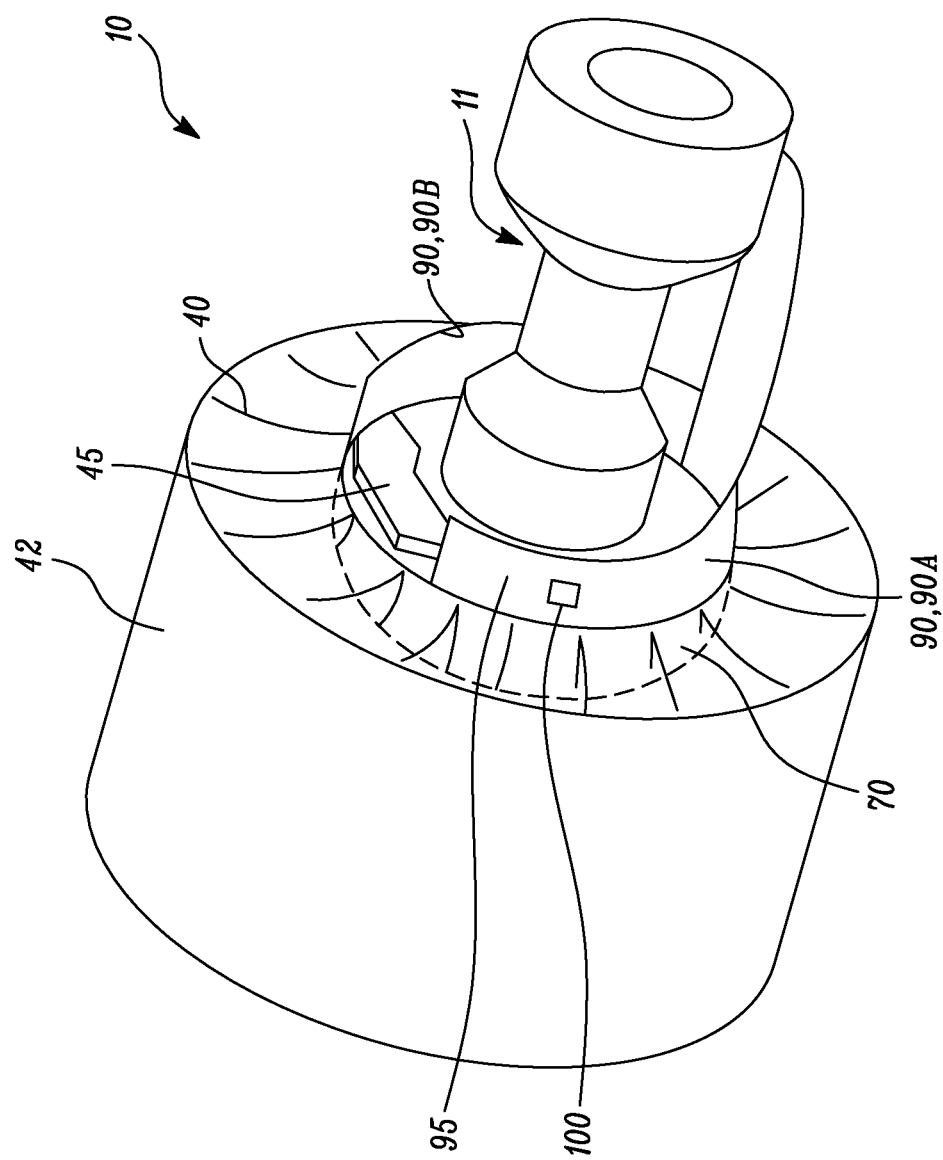
FIG. 2 is a schematic rear perspective view of the turbine engine without its nacelle and without most of its inner cowl.

FIG. 2 shows schematically a rear perspective view of the gas turbine engine 10 with the nacelle 21 (shown in FIG. 1), and most of the inner cowl 80 (shown in FIG. 1) removed. The outer guide vanes 40 extend radially from the inner ring 70 to the fan case 42, and the engine core 11 projects rearwardly from the plane of the outer guide vanes 40. A fixture 45 provides a connection point for mounting the gas turbine engine to an aircraft.

An inner barrel 90 surrounds the engine core 11 and bridges the inner ring 70 and the inner cowl 80 (shown in FIG. 1). Specifically, in the illustrated embodiment of FIG. 2, a two-part inner barrel 90A, 90B (collectively, the inner barrel 90) attached to the inner ring 70 bridges the space between the inner ring 70 and the inner cowl 80. In other variants, however, the inner barrel 90 can be formed as a single, continuous component.

FIG. 2 further illustrates an inlet assembly 100 (schematically shown) being mounted to the inner barrel 90. In some other embodiments, the inlet assembly 100 is mounted to the bypass duct 22 (shown in FIG. 1). Specifically, the inlet assembly 100 is mounted to a surface 95 of the inner barrel 90 or the bypass duct 22. The inlet assembly 100 will be discussed in more detail below.

Referring to FIGS. 3A to 3G, the inlet assembly 100 includes a web 110, a load transfer flange 120, a plurality of first vanes 130, and a plurality of second vanes 140.

The web 110 extends between a first end 112 and a second end 114 along a first axis 111. The web 110 includes a first major surface 116 and a second major surface 118 opposite to the first major surface 116. Each of the first major surface 116 and the second major surface 118 extends at least along the first axis 111 and a second axis 113 orthogonal to the first axis 111.

The load transfer flange 120 is at least partially disposed around the web 110 and configured to be fixedly coupled to the gas turbine engine 10 (shown in FIG. 1).

The plurality of first vanes 130 is spaced apart from each other at least along the first axis 111 and defines a plurality of first inlet passages 132 therebetween. Each first vane 130 from the plurality of first vanes 130 extends between the first major surface 116 of the web 110 and the load transfer flange 120 at least along a third axis 115 orthogonal to each of the first axis 111 and the second axis 113. Further, each first vane 130 is fixedly coupled to the web 110 and the load transfer flange 120. In some embodiments, each first vane 130 is directly coupled to the web 110 and/or the load transfer flange 120. In some other embodiments, each first vane 130 is indirectly coupled to the web 110 and/or the load transfer flange 120.

In some embodiments, the plurality of first vanes 130 includes at least a first foremost vane 130A disposed proximal to the first end 112 and a first rearmost vane 130N disposed proximal to the second end 114. In the illustrated embodiment of FIGS. 3A to 3G, the plurality of first vanes 130 includes four first vanes 130. However, in some other embodiments, the plurality of first vanes 130 may include greater or lesser than four first vanes 130. A number of the plurality of first vanes 130 may be varied as per application requirements.

The plurality of second vanes 140 is spaced apart from each other at least along the first axis 111 and defines a plurality of second inlet passages 142 therebetween. Each second vane 140 from the plurality of second vanes 140 extends between the second major surface 118 of the web 110 and the load transfer flange 120 at least along the third axis 115. Further, each second vane 140 is fixedly coupled to the web 110 and the load transfer flange 120. In some embodiments, each second vane 140 is directly coupled to the web 110 and/or the load transfer flange 120. In some other embodiments, each second vane 140 is indirectly coupled to the web 110 and/or the load transfer flange 120.

In some embodiments, the plurality of second vanes 140 includes at least a second foremost vane 140A disposed proximal to the first end 112 and a second rearmost vane 140N disposed proximal to the second end 114. In the illustrated embodiment of FIGS. 3A to 3G, the plurality of second vanes 140 includes four second vanes 140. However, in some other embodiments, the plurality of second vanes 140 may include greater or lesser than four second vanes 140. A number of the plurality of second vanes 140 may be varied as per application requirements.

Advantageously, the web 110 and the load transfer flange 120 of the inlet assembly 100 may provide a structural reinforcement to a surface, for e.g., the surface 95 (shown in FIG. 2) of the inner barrel 90 or a surface of the bypass duct 22 (shown in FIG. 1) of the gas turbine engine 10 (shown in FIG. 1) to which the inlet assembly 100 is coupled. Specifically, the web 110 and the load transfer flange 120 may provide a structural load path to the surface. The web 110 may further position, restrict movement, and/or support the plurality of first vanes 130 and the plurality of second vanes 140. Further, the web 110 disposed between the plurality of first vanes 130 and the plurality of second vanes 140 may prevent twisting of the plurality of first vanes 130 and the plurality of second vanes 140 due to any loads applied on the plurality of first vanes 130 and/or the plurality of second vanes 140. The load transfer flange 120 may be configured to distribute any load applied to the inlet assembly 100 (for example, any load applied on the web 110, the plurality of first vanes 130, and/or the plurality of second vanes 140) over a large area of the surface to which the inlet assembly 100 is coupled. Therefore, the surface may not require additional components and/or materials that may be conventionally required to reinforce the surface when a conventional inlet assembly is mounted thereto. This may decrease an overall mass of the gas turbine engine 10 and may further decrease a cost of the gas turbine engine 10.

In some embodiments, one or more components of the inlet assembly 100 may be formed by an additive manufacturing process. For example, the additive manufacturing process may include additive layer manufacturing (ALM). The ALM may include selective laser melting, electron beam melting, blown powder deposition, or equivalent alternative ALM processes. The overall size, shape, and material of the one or more components may therefore be varied conveniently using ALM as per application requirements, for example, stiffness and/or hardness requirements. This may also reduce manufacturing costs of the inlet assembly 100. In some other embodiments, one or more components of the inlet assembly 100 may be formed by a moulding process, such as an injection moulding process.

In some embodiments, the inlet assembly 100 further includes a first support structure 150 disposed opposite to the first major surface 116 of the web 110 and connected to each first vane 130. The first support structure 150 couples each first vane 130 to the load transfer flange 120. Therefore, the first support structure 150 may transfer, via the load transfer flange 120, any loads applied on the plurality of first vanes 130 to the surface to which the inlet assembly 100 is coupled.

In some embodiments, the first support structure 150 may be integrally formed with the plurality of first vanes 130. In some other embodiments, the first support structure 150 may be formed as a separate component and coupled to the plurality of first vanes 130.

Figure 5:
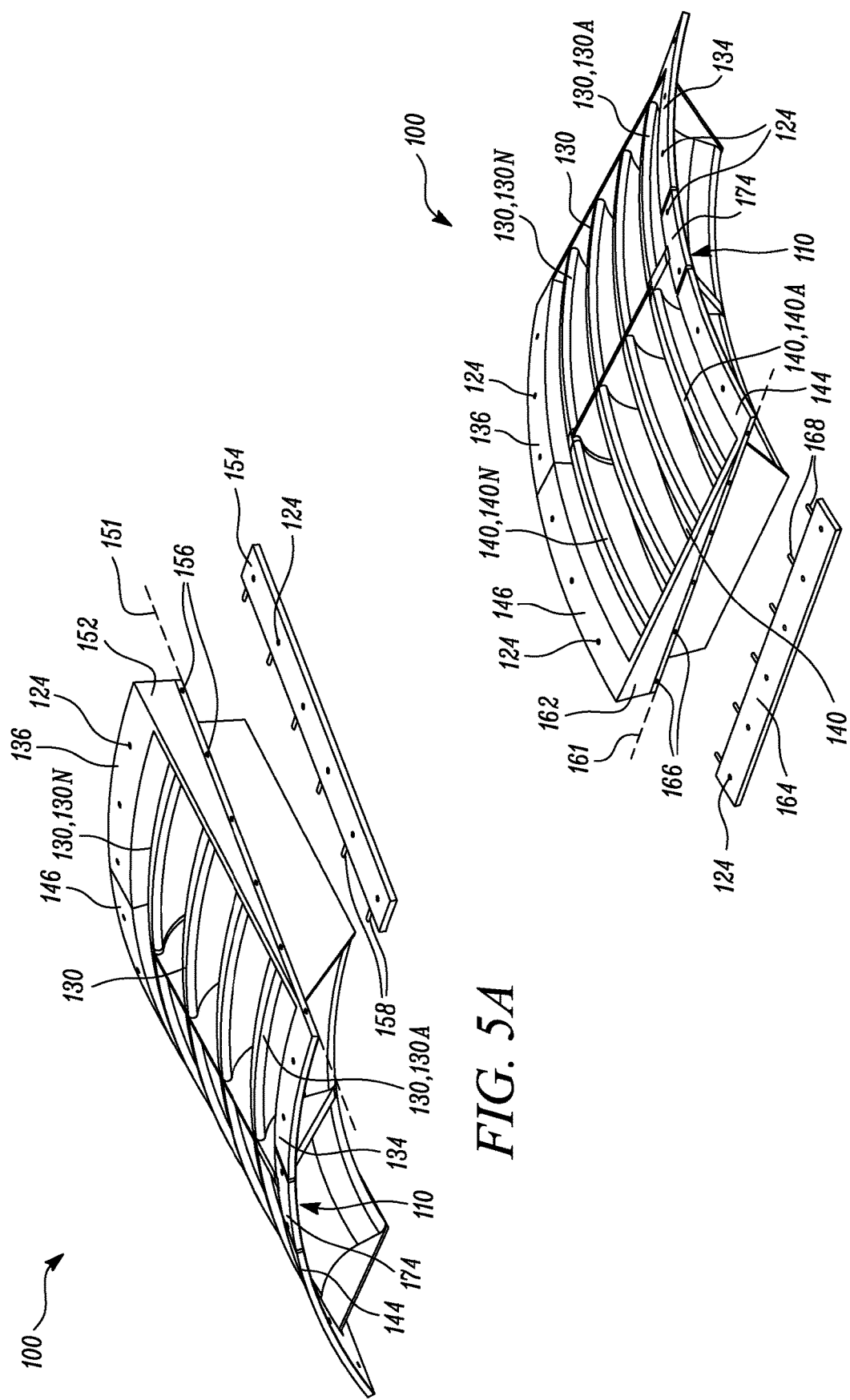
FIG. 5A illustrates a schematic partially exploded right side perspective view of the inlet assembly without the load transfer flange.
FIG. 5B illustrates a schematic partially exploded left side perspective view of the inlet assembly without the load transfer flange.

In some embodiments, the first support structure 150 includes a first plate 152 and a first flange 154. In some embodiments, the first plate 152 and the first flange 154 of the first support structure 150 may be integrally formed as a single component. In some other embodiments, the first plate 152 and the first flange 154 of the first support structure 150 may be formed as separate components (as shown in FIG. 5A).

The first plate 152 opposes the first major surface 116 of the web 110 and is connected to each first vane 130. The first flange 154 is connected to the first plate 152 and extends from the first plate 152 opposite to the first major surface 116. The first flange 154 couples each first vane 130 to the load transfer flange 120. Therefore, the first flange 154 of the first support structure 150 may transfer, via the load transfer flange 120, any loads applied on the plurality of first vanes 130 to the surface to which the inlet assembly 100 is coupled.

In some embodiments, the first plate 152 is connected to the first flange 154, such that the first flange 154 extends along a first line 151 (shown in FIG. 3C) obliquely inclined to the first axis 111 by a first inclination angle 153.

Similarly, in some embodiments, the inlet assembly 100 further includes a second support structure 160 disposed opposite to the second major surface 118 of the web 110 and connected to each second vane 140. The second support structure 160 couples each second vane 140 to the load transfer flange 120. Therefore, the second support structure 160 may transfer, via the load transfer flange 120, any loads applied on the plurality of second vanes 140 to the surface to which the inlet assembly 100 is coupled.

In some embodiments, the second support structure 160 may be integrally formed with the plurality of second vanes 140. In some other embodiments, the second support structure 160 may be formed as a separate component and coupled to the plurality of second vanes 140.

In some embodiments, the second support structure 160 includes a second plate 162 and a second flange 164. In some embodiments, the second plate 162 and the second flange 164 of the second support structure 160 may be integrally formed as a single component. In some other embodiments, the second plate 162 and the second flange 164 of the second support structure 160 may be formed as separate components (as shown in FIG. 5B).

The second plate 162 opposes the second major surface 118 of the web 110 and is connected to each second vane 140. The second flange 164 is connected to the second plate 162 and extends from the second plate 162 opposite to the second major surface 118. The second flange 164 couples each second vane 140 to the load transfer flange 120. Therefore, the second flange 164 of the second support structure 160 may transfer, via the load transfer flange 120, any loads applied on the plurality of second vanes 140 to the surface to which the inlet assembly 100 is coupled.

In some embodiments, the second plate 162 is connected to the second flange 164, such that the second flange 164 extends along a second line 161 (shown in FIG. 3D) obliquely inclined to the first axis 111 by a second inclination angle 163.

Therefore, the plurality of first vanes 130 may be staggered relative to each other when the inlet assembly 100 is coupled to the surface due to arrangement along the first line 151. Similarly, the plurality of second vanes 140 may be staggered relative to each other when the inlet assembly 100 is coupled to the surface due to arrangement along the second line 161. The extent of stagger of the plurality of first vanes 130 and the plurality of second vanes 140 may be controlled by the first and second inclination angles 153, 163, respectively. The values of the first and second inclination angles 153, 163 may be based on application requirements, for example, a shape of the surface to which the inlet assembly 100 is coupled.

However, in some other embodiments, the first plate 152 is connected to the first flange 154, such that the first flange 154 extends along the first axis 111 and the second plate 162 is connected to the second flange 164, such that the second flange 164 extends along the first axis 111.

Further, since in some cases, each of the first support structure 150 and the second support structure 160 may not be formed as a single component, the first support structure 150 and the second support structure 160 may be formed conveniently using the additive manufacturing process. This may also reduce manufacturing costs of the inlet assembly 100. Moreover, the overall size, shape, and material of the first support structure 150 and the second support structure 160 may be varied conveniently using ALM as per application requirements. This may also improve the repairability of the inlet assembly 100.

In some embodiments, the inlet assembly 100 further includes a first foremost flange 134. In some embodiments, the first foremost flange 134 couples each first vane 130 to the load transfer flange 120.

In the illustrated embodiment of FIGS. 3A-3G, the first support structure 150 includes the first foremost flange 134 coupling the first plate 152 to the load transfer flange 120. Further, the first foremost flange 134 and the first flange 154 are arranged in a substantially L-shaped configuration. However, in some other embodiments, the first foremost flange 134 and the first flange 154 may be arranged in a shape based on a shape of the load transfer flange 120. In some embodiments, the first foremost flange 134 and the first flange 154 are integrally formed. However, in some other embodiments, the first foremost flange 134 and the first flange 154 may be formed as separate components.

In some other embodiments, the first foremost flange 134 couples the first foremost vane 130A to the load transfer flange 120. In such embodiments, the first foremost flange 134 is connected to an outboard end 131 of the first foremost vane 130A and extends from the first foremost vane 130A at least along the first axis 111. The outboard end 131 of the first foremost vane 130A is distal to the load transfer flange 120. In such embodiments, the first foremost flange 134 may be integrally formed with the first foremost vane 130A.

In some embodiments, the inlet assembly 100 further includes a first rearmost flange 136. In some embodiments, the first rearmost flange 136 and the first foremost flange 134 extend in opposite directions relative to each other. In some embodiments, the first rearmost flange 136 couples each first vane 130 to the load transfer flange 120.

In the illustrated embodiment of FIGS. 3A-3G, the first support structure 150 includes the first rearmost flange 136. The first rearmost flange 136 is spaced apart from the first foremost flange 134 along the first axis 111 and couples the first plate 152 to the load transfer flange 120. Further, the first rearmost flange 136 and the first flange 154 are arranged in a substantially L-shaped configuration. However, in some other embodiments, the first rearmost flange 136 and the first flange 154 may be arranged in a shape based on the shape of the load transfer flange 120. In some embodiments, the first rearmost flange 136 and the first flange 154 are integrally formed. However, in some other embodiments, the first rearmost flange 136 and the first flange 154 may be formed as separate components.

In some other embodiments, the first rearmost flange 136 couples the first rearmost vane 130N to the load transfer flange 120. In such embodiments, the first rearmost flange 136 is connected to an inboard end 133 of the first rearmost vane 130N and extends from the first rearmost vane 130N at least along the first axis 111. The inboard end 133 of the first rearmost vane 130N is proximal to the load transfer flange 120. In such embodiments, the first rearmost flange 136 may be integrally formed with the first rearmost vane 130N.

The first foremost flange 134 and the first rearmost flange 136 may transfer, via the load transfer flange 120, any loads applied on the plurality of first vanes 130 to the surface to which the inlet assembly 100 is coupled.

In some embodiments, the inlet assembly 100 further includes a second foremost flange 144. In some embodiments, the second foremost flange 144 couples each second vane 140 to the load transfer flange 120.

In the illustrated embodiment of FIGS. 3A-3G, the second support structure 160 includes the second foremost flange 144 coupling the second plate 162 to the load transfer flange 120. The second foremost flange 144 is spaced apart from the first foremost flange 134 along the third axis 115. Further, the second foremost flange 144 and the second flange 164 are arranged in a substantially L-shaped configuration. However, in some other embodiments, the second foremost flange 144 and the second flange 164 may be arranged in a shape based on the shape of the load transfer flange 120. In some embodiments, the second foremost flange 144 and the second flange 164 are integrally formed. However, in some other embodiments, the second foremost flange 144 and the second flange 164 may be formed as separate components.

In some other embodiments, the second foremost flange 144 couples the second foremost vane 140A to the load transfer flange 120. In such embodiments, the second foremost flange 144 is connected to an outboard end 141 of the second foremost vane 140A and extends from the second foremost vane 140A at least along the first axis 111. The outboard end 141 of the second foremost vane 140A is distal to the load transfer flange 120. In such embodiments, the second foremost flange 144 may be integrally formed with the second foremost vane 140A.

In some embodiments, the inlet assembly 100 further includes a second rearmost flange 146. In some embodiments, the second rearmost flange 146 and the second foremost flange 144 extend in opposite directions relative to each other. In some embodiments, the second rearmost flange 146 couples each second vane 140 to the load transfer flange 120.

In the illustrated embodiment of FIGS. 3A-3G, the second support structure 160 includes the second rearmost flange 146. The second rearmost flange 146 is spaced apart from the first rearmost flange 136 along the third axis 115. Further, the second rearmost flange 146 is spaced apart from the second foremost flange 144 along the first axis 111. The second rearmost flange 146 couples the second plate 162 to the load transfer flange 120. Further, the second rearmost flange 146 and the second flange 164 are arranged in a substantially L-shaped configuration. However, in some other embodiments, the second rearmost flange 146 and the second flange 164 may be arranged in a shape based on the shape of the load transfer flange 120. Furthermore, the second rearmost flange 146 and the second flange 164 are integrally formed. However, in some other embodiments, the second rearmost flange 146 and the second flange 164 may be formed as separate components.

In some other embodiments, the second rearmost flange 146 couples the second rearmost vane 140N to the load transfer flange 120. In such embodiments, the second rearmost flange 146 is connected to an inboard end 143 of the second rearmost vane 140N and extends from the second rearmost vane 140N at least along the first axis 111. The inboard end 143 of the second rearmost vane 140N is proximal to the load transfer flange 120. In such embodiments, the second rearmost flange 146 may be integrally formed with the second rearmost vane 140N.

The second foremost flange 144 and the second rearmost flange 146 may transfer, via the load transfer flange 120, any loads applied on the plurality of second vanes 140 to the surface to which the inlet assembly 100 is coupled.

In some embodiments, the web 110 further includes a foremost flange 174. The foremost flange 174 couples the web 110 to the load transfer flange 120. The foremost flange 174 is disposed proximal to the first end 112 of the web 110.

Figure 3A:
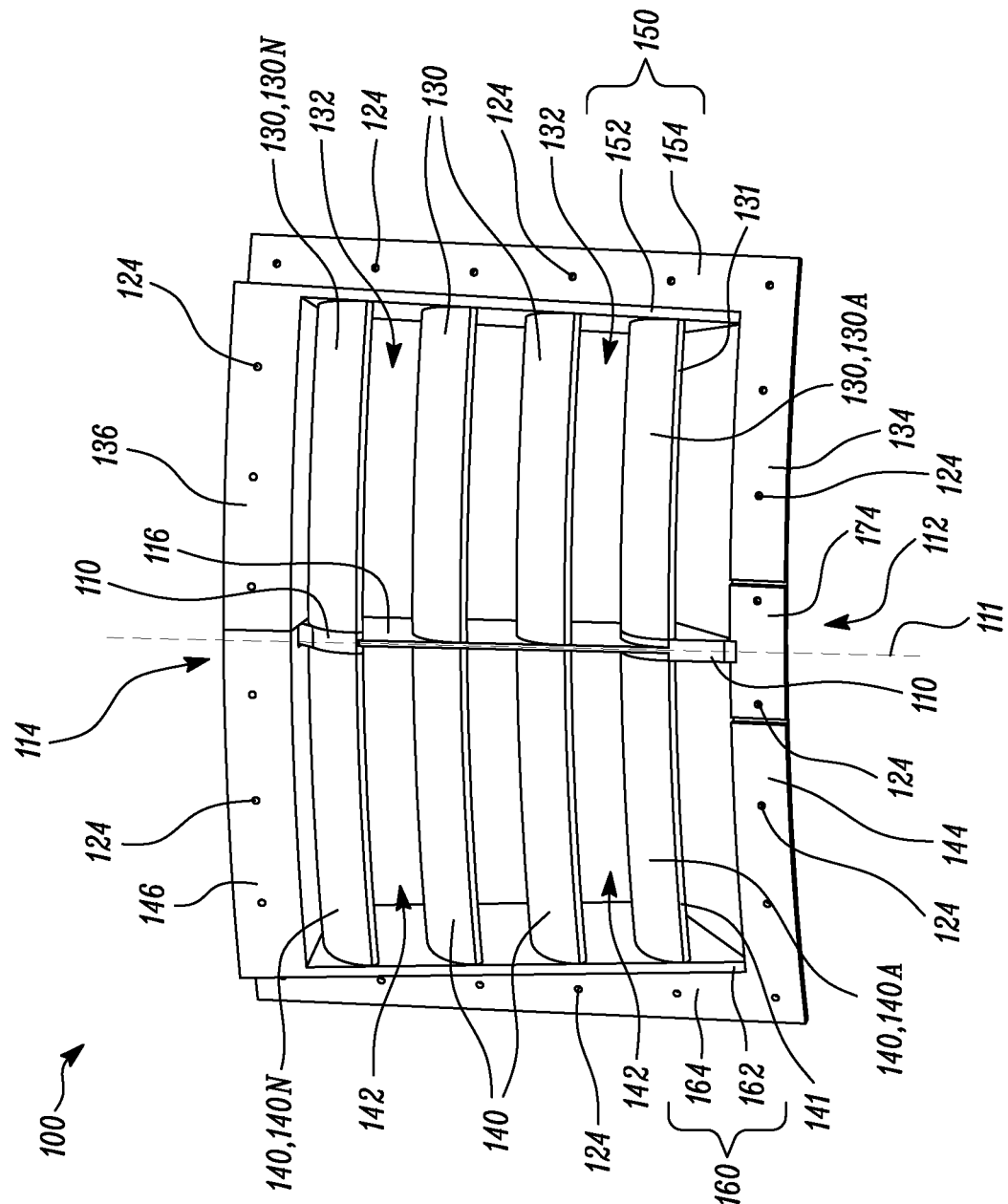
FIG. 3A is a schematic top view of an inlet assembly for the gas turbine engine.
Figure 3B:
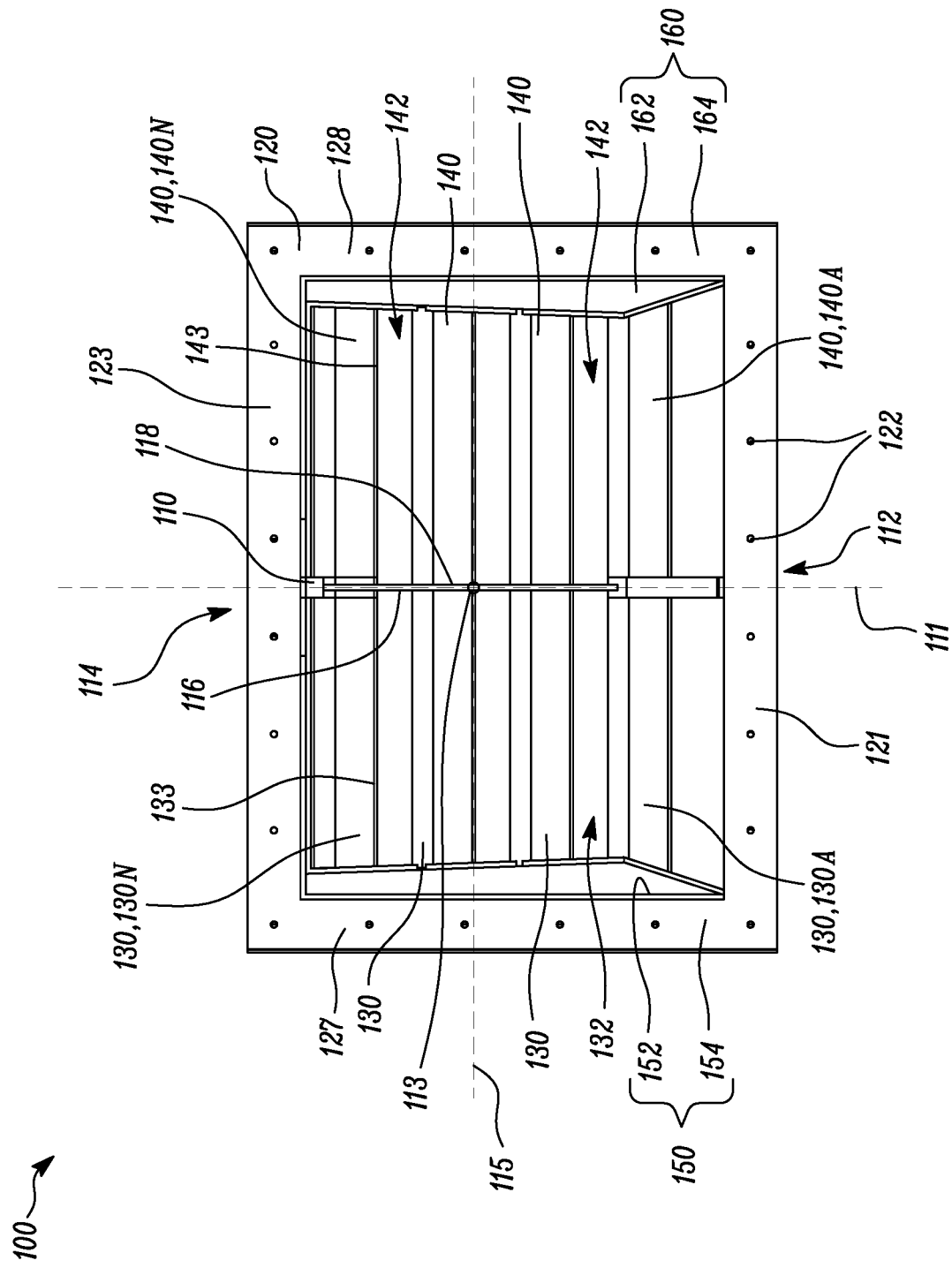
FIG. 3B is a schematic bottom view of the inlet assembly.
Figure 3C:
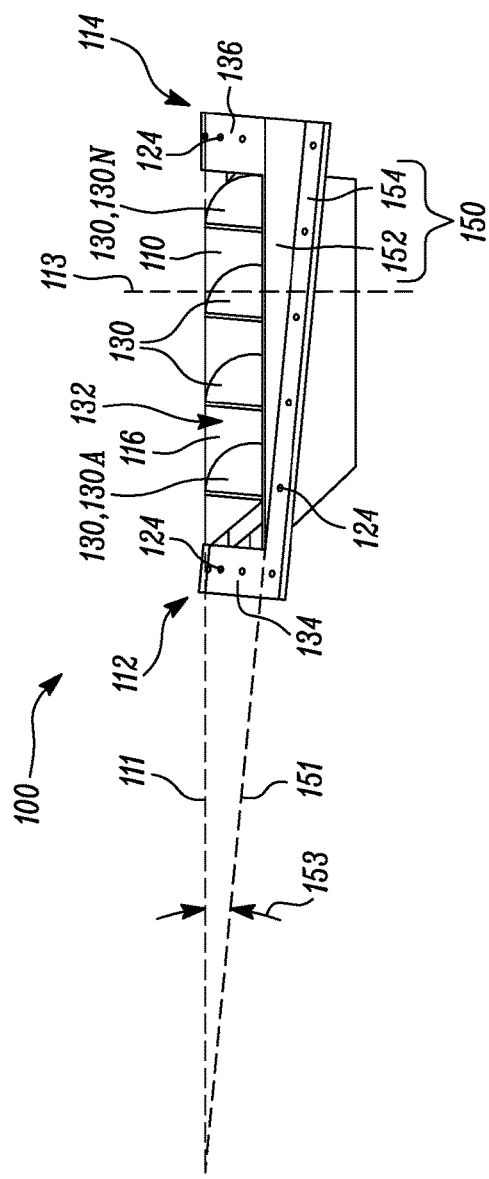
FIG. 3C is a schematic right side view of the inlet assembly.
Figure 3D:
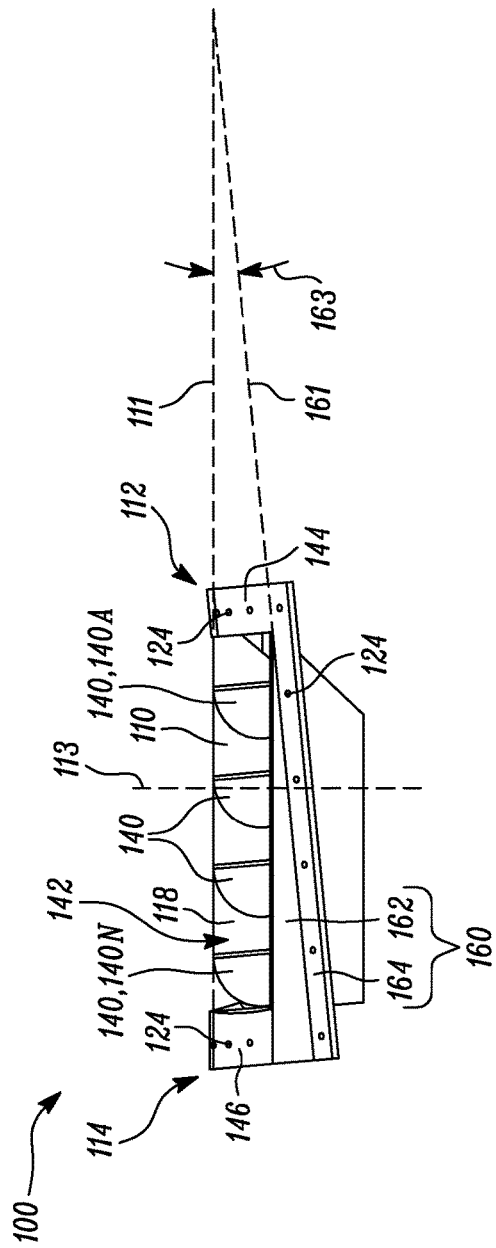
FIG. 3D is a schematic left side view of the inlet assembly.
Figures 3E, 3F:
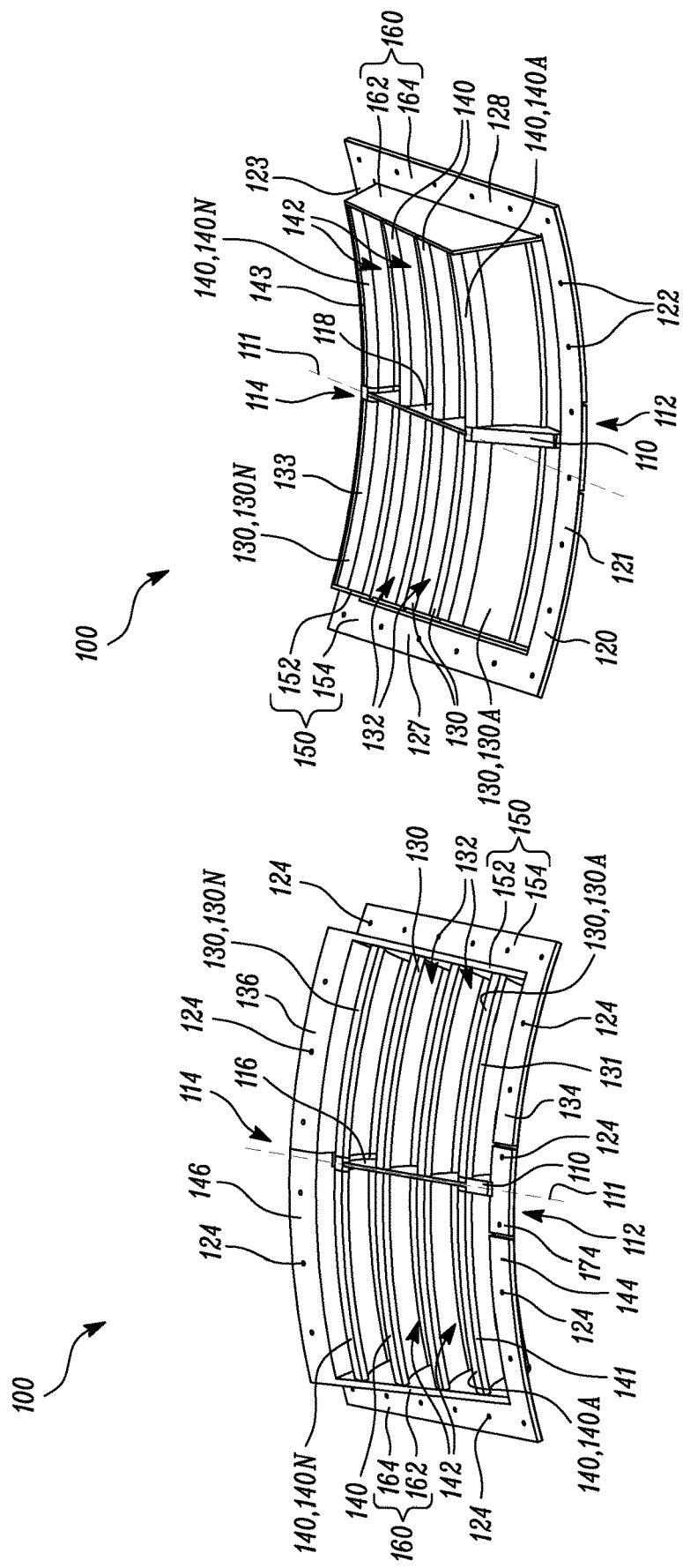
FIG. 3E is a schematic top perspective view of the inlet assembly.
FIG. 3F is a schematic bottom perspective view of the inlet assembly.
Figure 3G:
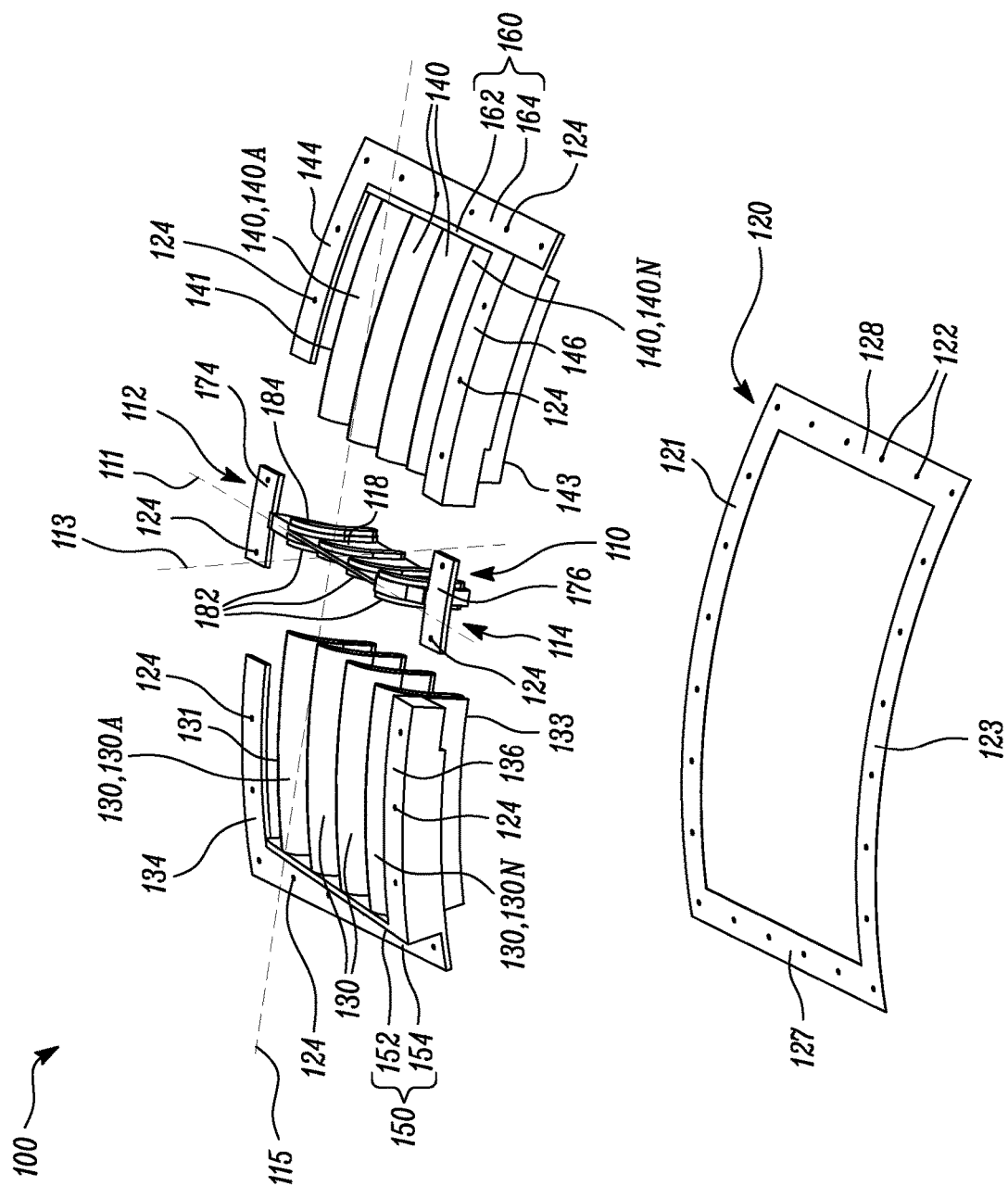
FIG. 3G is a schematic exploded top perspective view of the inlet assembly.

In some embodiments, the web 110 further includes a rearmost flange 176 (shown in FIG. 3G). The rearmost flange 176 is disposed proximal to the second end 114 of the web 110. The rearmost flange 176 couples the web 110 to the load transfer flange 120.

In the illustrated embodiment of FIGS. 3A-3G, the rearmost flange 176 overlaps with a portion of each of the first rearmost flange 136 and the second rearmost flange 146.

Therefore, the foremost flange 174 and the rearmost flange 176 may transfer, via the load transfer flange 120, any loads applied on the web 110 to the surface to which the inlet assembly 100 is coupled. Further, the foremost flange 174 and the rearmost flange 176 may transfer, via the load transfer flange 120, any loads applied on the plurality of first vanes 130 and/or the plurality of second vanes 140, which are coupled to the web 110, to the surface.

In some embodiments, the load transfer flange 120 includes a first end portion 121, a second end portion 123, a first lateral portion 127, and a second lateral portion 128. The first end portion 121 extends at least along the third axis 115. The second end portion 123 extends at least along the third axis 115 and is spaced apart from the first end portion 121 at least along the first axis 111. The first lateral portion 127 extends from the first end portion 121 to the second end portion 123. Further, the second lateral portion 128 extends from the first end portion 121 to the second end portion 123 and is spaced apart from the first lateral portion 127 at least along the third axis 115.

In some embodiments, the first end portion 121 is proximal to an adjacent first vane 130 from the plurality of first vanes 130 and an adjacent second vane 140 from the plurality of second vanes 140. For example, in the illustrated embodiment of FIG. 3G, the first end portion 121 is proximal to the first foremost vane 130A from the plurality of first vanes 130 and the second foremost vane 140A from the plurality of second vanes 140.

In some embodiments, the second end portion 123 is proximal to an adjacent first vane 130 from the plurality of first vanes 130 and an adjacent second vane 140 from the plurality of second vanes 140. For example, in the illustrated embodiment of FIG. 3G, the second end portion 123 is proximal to the first rearmost vane 130N from the plurality of first vanes 130 and the second rearmost vane 140N from the plurality of second vanes 140.

In some embodiments, the first lateral portion 127 is coupled to each first vane 130. Further, in some embodiments, the second lateral portion 128 is coupled to each second vane 140.

In some embodiments, the load transfer flange 120 is integrally formed as a single component. In some embodiments, the load transfer flange 120 has a closed shape. The closed shape may enhance distribution of loads from the inlet assembly 100 to the surface. In some embodiments, the load transfer flange 120 may be formed using the additive manufacturing process. The shape of the load transfer flange 120 may be based on a shape of the surface to which the inlet assembly 100 is coupled.

In some embodiments, each of the first end portion 121 and the second end portion 123 is curved, and each of the first lateral portion 127 and the second lateral portion 128 is linear. In some embodiments, each of the first end portion 121, the second end portion 123, the first lateral portion 127, and the second lateral portion 128 is curved.

The first end portion 121, the second end portion 123, the first lateral portion 127, and the second lateral portion 128 that are curved may conform to the shape of the surface (e.g., the surface of the inner barrel or the surface of the bypass duct 22) to which the inlet assembly 100 is coupled. This may enhance distribution of loads from the inlet assembly 100 to the surface. In some embodiments, the surface may be machined to conform to the shape of the load transfer flange 120.

In some embodiments, the first foremost flange 134 and the second foremost flange 144 are coupled to the first end portion 121 of the load transfer flange 120. Further, the first rearmost flange 136 and the second rearmost flange 146 are coupled to the second end portion 123 of the load transfer flange 120. In some embodiments, the first flange 154 is coupled to the first lateral portion 127 of the load transfer flange 120, and the second flange 164 is coupled to the second lateral portion 128 of the load transfer flange 120.

In some embodiments, the plurality of first vanes 130 and the plurality of second vanes 140 may include a same material. In some embodiments, the plurality of first vanes 130 and the plurality of second vanes 140 may include different materials.

In some embodiments, the plurality of first vanes 130 and the plurality of second vanes 140 may include any suitable material or combination of materials. For example, the material of the plurality of first vanes 130 and the plurality of second vanes 140 may include a composite, such as a metal matrix composite and/or an organic matrix composite, such as a carbon fibre. In some examples, the material of the plurality of first vanes 130 and the plurality of second vanes 140 may include a variety of plastics, for example, polyaryletherketone (PAEK), polyetheretherketone (PEEK), and/or polyetherketoneketone (PEKK).

In some embodiments, the web 110 may include a material including one or more of: steel and its alloys, aluminium and its alloys, titanium and its alloys, nickel and its alloys, copper and its alloys, or a plastic material. For example, the material of the web 110 may include a composite, such as a metal matrix composite and/or an organic matrix composite, such as a carbon fibre. In some examples, the material of the web 110 may include a variety of plastics, for example, PAEK, PEEK, PEKK. In some examples, the material of the web 110 may include a titanium based metal or an aluminium based metal (e.g., an aluminium-lithium alloy), and/or a steel based metal alloy.

In some embodiments, the material of the web 110 may be stronger (e.g., stiffer and/or harder) than the material of the plurality of first vanes 130 and the plurality of second vanes 140.

In some embodiments, the load transfer flange 120 may also include a material including one or more of: steel and its alloys, aluminium and its alloys, titanium and its alloys, nickel and its alloys, copper and its alloys, or a plastic material. For example, the material of the load transfer flange 120 may include a composite, such as a metal matrix composite and/or an organic matrix composite, such as a carbon fibre. In some examples, the material of the load transfer flange 120 may include a variety of plastics, for example, PAEK, PEEK, PEKK. In some examples, the material of the load transfer flange 120 may include a titanium based metal or an aluminium based metal (e.g., an aluminium-lithium alloy), and/or a steel based metal alloy. In some embodiments, the load transfer flange 120 may include a material having a rate of thermal expansion similar to that of the material of the plurality of first vanes 130 and the plurality of second vanes 140.

In some embodiments, the web 110 and the load transfer flange 120 may include a similar material. In some other embodiments, the web 110 and the load transfer flange 120 may include different materials. The material(s) of the web 110 and the load transfer flange 120 may be based on application requirements.

In some embodiments, the load transfer flange 120 may be stronger (e.g., stiffer and/or harder) than the material of the plurality of first vanes 130, the plurality of second vanes 140, and the web 110.

Figure 4:
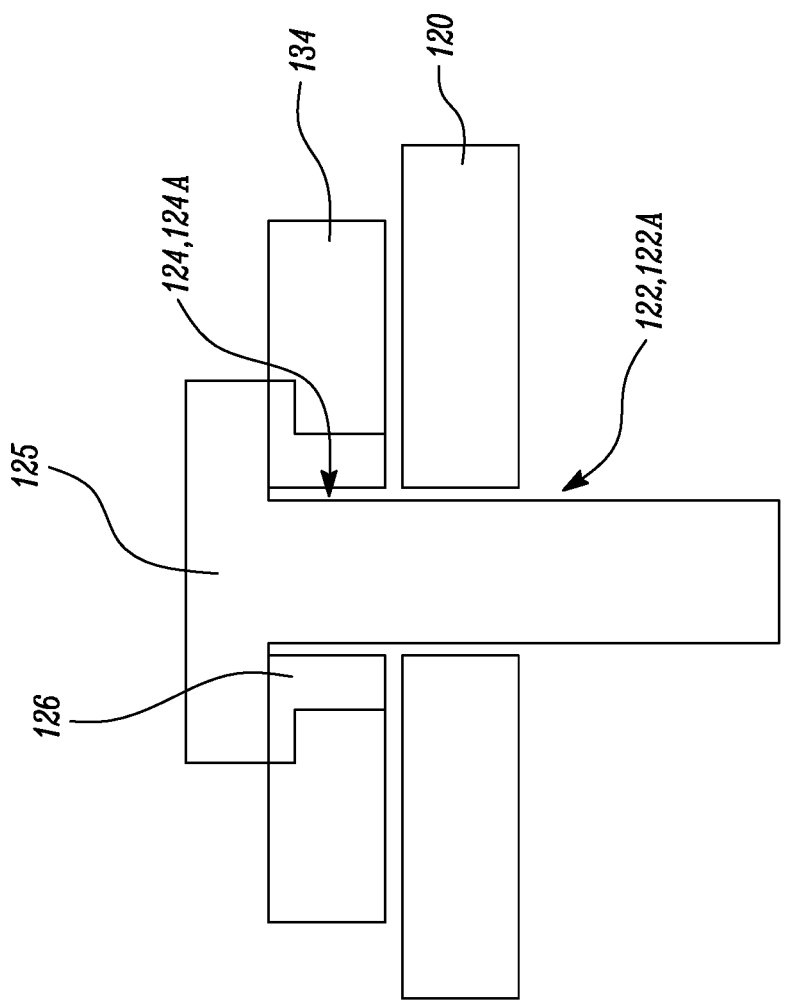
FIG. 4 is a schematic sectional side view of a first foremost flange and a load transfer flange of the inlet assembly.

FIG. 4 illustrates a schematic sectional side view of the first foremost flange 134 and the load transfer flange 120, according to an embodiment of the present disclosure.

Referring to FIGS. 3A-3G and 4, in some embodiments, the load transfer flange 120 defines a plurality of first apertures 122 extending therethrough. In some embodiments, each of the first foremost flange 134, the first rearmost flange 136, the second foremost flange 144, the second rearmost flange 146, the first flange 154, the second flange 164, the foremost flange 174, and the rearmost flange 176 defines a plurality of second apertures 124 extending therethrough and aligned with at least some of the plurality of first apertures 122 for at least partially receiving corresponding fasteners 125 therein. In some embodiments, each of the plurality of second apertures 124 is aligned with a corresponding first aperture 122 from the plurality of first apertures 122.

Therefore, the web 110 and the load transfer flange 120 coupled to the plurality of first vanes 130 and the plurality of second vanes 140 may provide the structural load path to the surface to which the inlet assembly 100 is coupled. Further, since the web 110, the plurality of first vanes 130, and the plurality of second vanes 140 are coupled to the load transfer flange 120 via the fasteners 125, the web 110, the plurality of first vanes 130, and/or the plurality of second vanes 140 may be easily replaced in case of any damage. This may further enhance the repairability of the inlet assembly 100.

In the illustrated embodiment of FIG. 4, the first foremost flange 134 defines a second aperture 124A from the plurality of second apertures 124 aligned with a corresponding first aperture 122A from the plurality of first apertures 122. Further, the second aperture 124A and the corresponding first aperture 122A at least partially receive a corresponding fastener 125 therein. In the illustrated embodiment of FIG. 4, the fastener 125 is a bolt. However, in some other embodiments, the fasteners 125 may include nut and bolt assemblies, rivets, or screws, and so forth.

Alternatively or additionally, the first foremost flange 134, the first rearmost flange 136, the second foremost flange 144, the second rearmost flange 146, the first flange 154, the second flange 164, the foremost flange 174, and the rearmost flange 176 may be coupled to the load transfer flange 120 via welding, or via an adhesive, such as an epoxy adhesive.

In some embodiments, each of the first foremost flange 134, the first rearmost flange 136, the second foremost flange 144, the second rearmost flange 146, the first flange 154, the second flange 164, the foremost flange 174, and the rearmost flange 176 includes a plurality of inserts 126 corresponding to the plurality of second apertures 124. In some embodiments, each insert 126 from the plurality of inserts 126 is at least partially received in a corresponding second aperture 124 from the plurality of second apertures 124. In some embodiments, a material of each insert 126 is different from the material of each of the first foremost flange 134, the first rearmost flange 136, the second foremost flange 144, the second rearmost flange 146, the first flange 154, the second flange 164, the foremost flange 174, and the rearmost flange 176. In some embodiments, the material of the plurality of inserts 126 may be stronger (e.g., stiffer and/or harder) than the material of each of the first foremost flange 134, the first rearmost flange 136, the second foremost flange 144, the second rearmost flange 146, the first flange 154, the second flange 164, the foremost flange 174, and the rearmost flange 176. In some embodiments, the material of the plurality of inserts 126 may include metals and/or metal alloys. In some cases, the material of plurality of inserts 126 may control variation in size of the second apertures 124 due to the thermal expansion. The plurality of inserts 126 may also prevent cracking of each of the first foremost flange 134, the first rearmost flange 136, the second foremost flange 144, the second rearmost flange 146, the first flange 154, the second flange 164, the foremost flange 174, and the rearmost flange 176 proximal to the plurality of second apertures 124 upon receiving the corresponding fasteners 125 therein.

In some embodiments, one or more components the inlet assembly 100 may be coated with one or more coatings. In some embodiments, the one or more coatings may be electroplated. In some embodiments, the one or more coatings may be painted. In some embodiments, the one or more coatings may include a wear resistant coating, an environmental barrier coating, a metallic coating, and the like. The one or more coatings may therefore enhance longevity of the one or more components of the inlet assembly 100.

In some embodiments, the one or more components of the inlet assembly 100 may be coated with the one or more coatings prior to assembly. This may provide additional stiffness, hardness, and/or reinforcement to the one or more components of the inlet assembly 100.

In some embodiments, the inlet assembly 100 may be coated with the one or more coatings after assembly of various components of the inlet assembly 100. This may provide additional stiffness and reinforcement to one or more components of the inlet assembly 100 as well as various joints between the one or more components of the inlet assembly 100.

FIGS. 5A and 5B illustrate schematic partially exploded right and left side perspective views, respectively, of the inlet assembly 100 without the load transfer flange 120 (shown in FIG. 3G), according to an embodiment of the present disclosure.

Referring to FIGS. 5A and 5B, in some embodiments, the first plate 152 defines a plurality of first openings 156 and the first flange 154 includes a plurality of first projections 158 corresponding to the plurality of first openings 156. In some embodiments, each of the plurality of first openings 156 at least partially receives a corresponding first projection 158 from the plurality of first projections 158 therein to connect the first flange 154 to the first plate 152.

In some embodiments, the plurality of first openings 156 extends along the first line 151 obliquely inclined to the first axis 111 (shown in FIG. 3C). Specifically, the plurality of first openings 156 extends along the first line 151 obliquely inclined to the first axis 111, such that the first flange 154 extends along the first line 151 obliquely inclined to the first axis 111. However, in some other embodiments, the plurality of first openings 156 extends along the first axis 111.

In some embodiments, the second plate 162 defines a plurality of second openings 166 and the second flange 164 includes a plurality of second projections 168 corresponding to the plurality of second openings 166. In some embodiments, each of the plurality of second openings 166 at least partially receives a corresponding second projection 168 from the plurality of second projections 168 therein to connect the second flange 164 to the second plate 162.

In some embodiments, the plurality of second openings 166 extends along the second line 161 obliquely inclined to the first axis 111. Specifically, the plurality of second openings 166 extends along the second line 161 obliquely inclined to the first axis 111, such that the second flange 164 extends along the second line 161 obliquely inclined to the first axis 111. However, in some other embodiments, the plurality of second openings 166 extends along the first axis 111.

Alternatively or additionally, the first plate 152 may connect to the first flange 154 and the second plate 162 may connect to the second flange 164 via welding, or via the adhesive.

Figure 6:
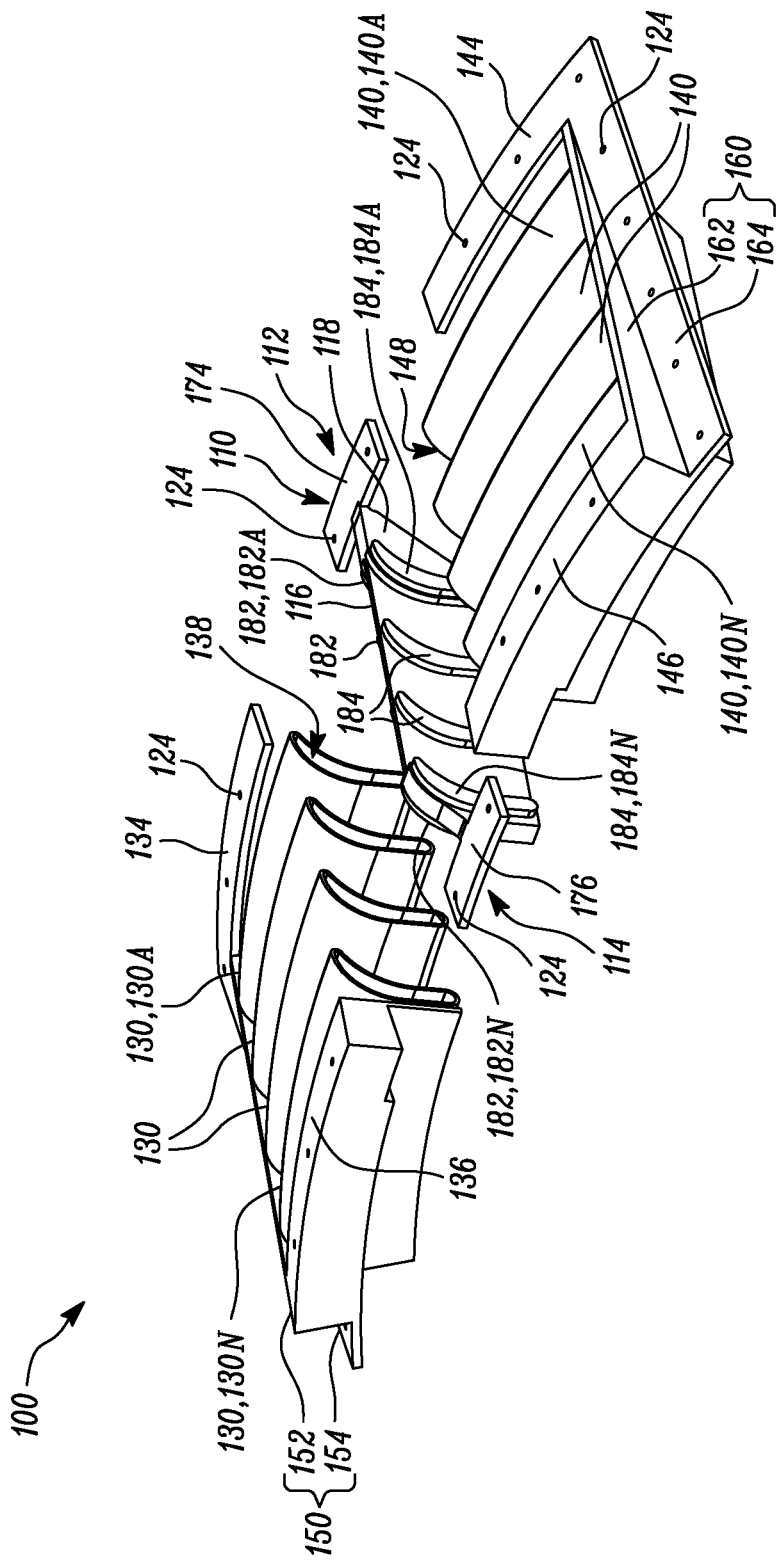
FIG. 6 is a schematic exploded side perspective view of the inlet assembly without the load transfer flange.

FIG. 6 illustrates a schematic exploded side perspective view of the inlet assembly 100 without the load transfer flange 120 (shown in FIG. 3G), according to an embodiment of the present disclosure.

In the illustrated embodiment of FIG. 6, each first vane 130 at least partially defines a first cavity 138 therein. The first cavity 138 faces the first major surface 116. Similarly, each second vane 140 at least partially defines a second cavity 148 therein. The second cavity 148 faces the second major surface 118.

Further, in the illustrated embodiment of FIG. 6, the web 110 includes a plurality of first protrusions 182 (also shown in FIG. 3G) corresponding to the plurality of first vanes 130. The plurality of first protrusions 182 extends from the first major surface 116 of the web 110 toward the plurality of first vanes 130. Similarly, the web 110 includes a plurality of second protrusions 184 corresponding to the plurality of second vanes 140. The plurality of second protrusions 184 extends from the second major surface 118 of the web 110 toward the plurality of second vanes 140.

In some embodiments, each first protrusion 182 from the plurality of first protrusions 182 is at least partially received within the first cavity 138 of a corresponding first vane 130 from the plurality of first vanes 130, and each second protrusion 184 from the plurality of second protrusions 184 is at least partially received within the second cavity 148 of a corresponding second vane 140 from the plurality of second vanes 140.

In some embodiments, the plurality of first protrusions 182 includes at least a first foremost protrusion 182A disposed proximal to the first end 112 and a first rearmost protrusion 182N disposed proximal to the second end 114. Similarly, in some embodiments, the plurality of second protrusions 184 includes at least a second foremost protrusion 184A disposed proximal to the first end 112 and a second rearmost protrusion 184N disposed proximal to the second end 114.

In some embodiments, the first foremost protrusion 182A, the first rearmost protrusion 182N, the second foremost protrusion 184A, and the second rearmost protrusion 184N may be reinforced, for example, with additional material. In such cases, the first foremost protrusion 182A and the first rearmost protrusion 182N may be thicker than the rest of the plurality of first protrusions 182. Similarly, the second foremost protrusion 184A and the second rearmost protrusion 184N may be thicker than the rest of the plurality of second protrusions 184.

Alternatively or additionally, each first protrusion 182 from the plurality of first protrusions 182 is bonded to the corresponding first vane 130 from the plurality of first vanes 130 and each second protrusion 184 from the plurality of second protrusions 184 is bonded to the corresponding second vane 140 from the plurality of second vanes 140 via welding, or via an adhesive, such as an epoxy adhesive.

Figure 7:
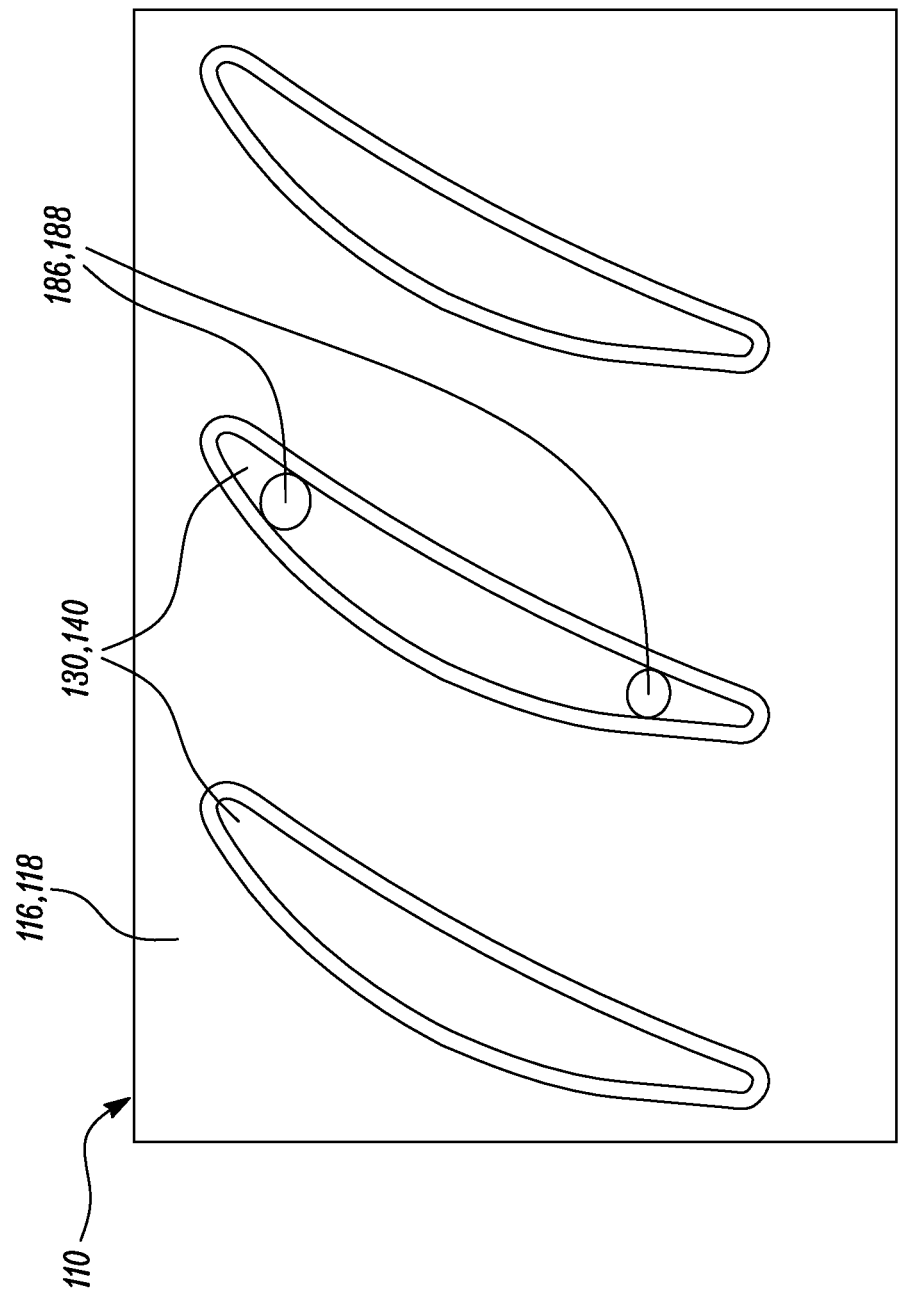
FIG. 7 is a schematic side view of a web of the inlet assembly.

FIG. 7 illustrates a schematic side view of the web 110, according to an embodiment of the present disclosure.

Referring to FIGS. 6 and 7, in some embodiments, the inlet assembly 100 includes a plurality of first pins 186 and a plurality of second pins 188.

In some embodiments, each first pin 186 from the plurality of first pins 186 is connected to and extends from the first major surface 116 of the web 110. Each first pin 186 is at least partially received within and engages the first cavity 138 of the corresponding first vane 130, such that each first pin 186 is coupled to the first cavity 138 of the corresponding first vane 130.

Similarly, in some embodiments, each second pin 188 from the plurality of second pins 188 is connected to and extends from the second major surface 118 of the web 110. Each second pin 188 is at least partially received within and engages the second cavity 148 of the corresponding second vane 140, such that each second pin 188 is coupled to the second cavity 148 of the corresponding second vane 140.

Alternatively or additionally, each first pin 186 from the plurality of first pins 186 is bonded to the corresponding first vane 130 from the plurality of first vanes 130 and each second pin 188 from the plurality of second pins 188 is bonded to the corresponding second vane 140 from the plurality of second vanes 140 via welding, or via an adhesive, such as an epoxy adhesive.

In the illustrated embodiment of FIG. 7, two first pins 186 extend from the first surface 116. The two first pins 186 are spaced apart from each other and engage the first cavity 138 of the corresponding first vane 130. Similarly, two second pins 188 extend from the second surface 118. The two second pins 188 are spaced apart from each other and engage the second cavity 148 of the corresponding second vane 140.

In some embodiments, the corresponding first vane 130 (e.g., as shown in FIG. 6) at least partially defines the first cavity 138 as an open cavity therein. In some other embodiments, the corresponding first vane 130 (e.g., as shown in FIG. 8) at least partially defines a plurality of cavities (not shown) corresponding to the first pins 186.

Similarly, in some embodiments, the corresponding second vane 140 (e.g., as shown in FIG. 6) at least partially defines the second cavity 148 as an open cavity therein. In some other embodiments, the corresponding second vane 140 (e.g., as shown in FIG. 8) at least partially defines a plurality of cavities (not shown) corresponding to the second pins 188.

In some other embodiments, each first pin 186 from the plurality of first pins 186 is connected to and extends from a corresponding first vane 130 from the plurality of first vanes 130. Each first pin 186 is at least partially received within and engages a cavity (not shown) in the web 110, such that the web 110 is coupled to the corresponding first vane 130. Similarly, in some embodiments, each second pin 188 from the plurality of second pins 188 is connected to and extends from a corresponding second vane 140 from the plurality of second vanes 140. Each second pin 188 is at least partially received within and engages a cavity (not shown) in the web 110, such that the web 110 is coupled to the corresponding second vane 140.

Figure 8:
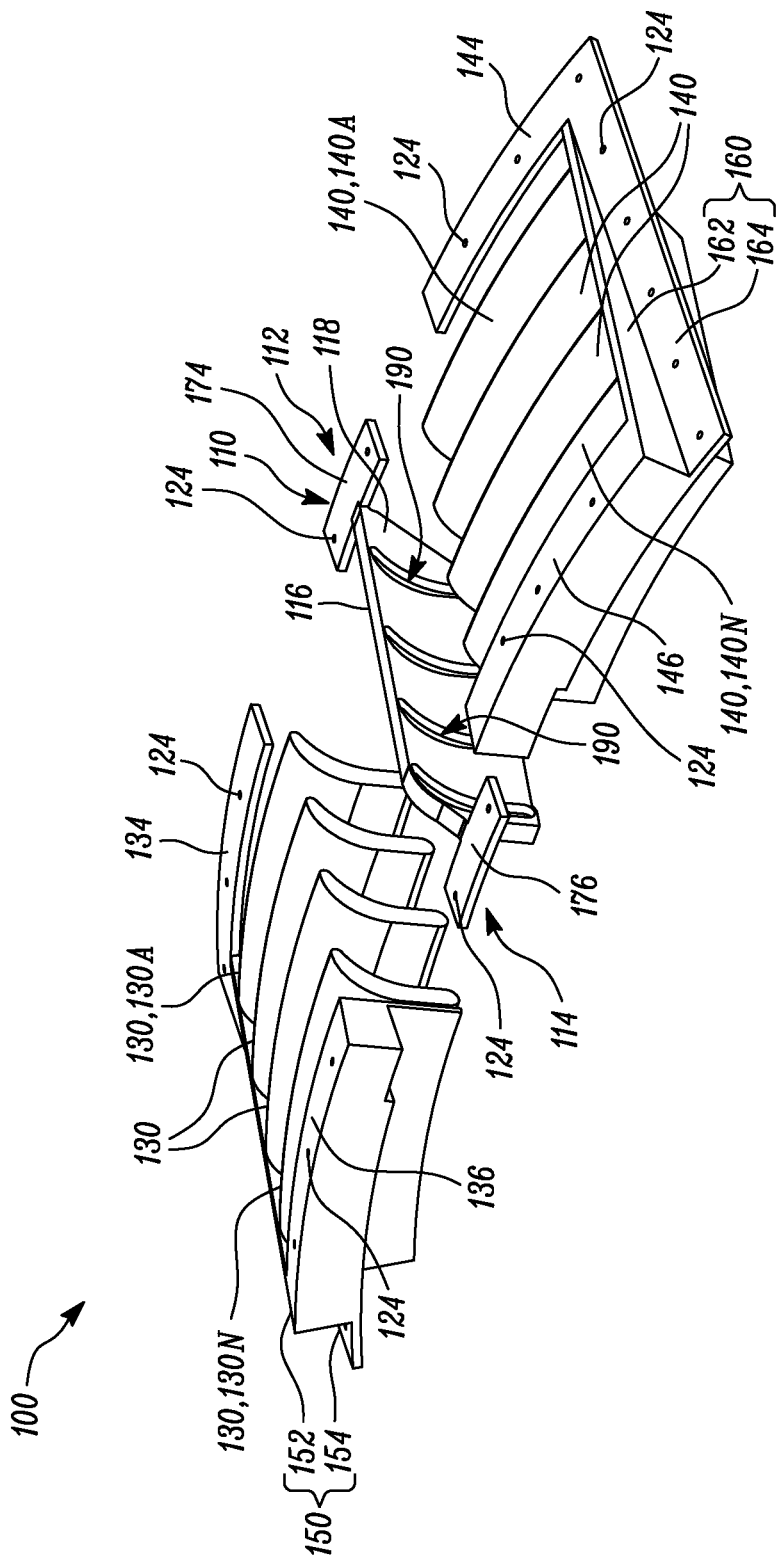
FIG. 8 is a schematic exploded side perspective view of the inlet assembly without the load transfer flange, according to another embodiment of the present disclosure.

FIG. 8 illustrates a schematic exploded side perspective view of the inlet assembly 100 without the load transfer flange 120 (shown in FIG. 3G), according to another embodiment of the present disclosure.

In some embodiments, the web 110 further includes a plurality of openings 190 extending therethrough from the first major surface 116 to the second major surface 118. Each first vane 130 is at least partially received within a corresponding opening 190 from the plurality of openings 190 of the web 110 and an opposing second vane 140 from the plurality of second vanes 140 is at least partially received within the corresponding opening 190.

In such embodiments, each first vane 130 may be solid. In other words, each first vane 130 may not define the first cavity 138 (shown in FIG. 6) therein. Further, each second vane 140 may be solid. In other words, each second vane 140 may not define the second cavity 148 (shown in FIG. 6) therein.

Alternatively or additionally, each first vane 130 from the plurality of first vanes 130 and each second vane 140 from the plurality of second vanes 140 is bonded to the web 110 via welding, or via an adhesive, such as an epoxy adhesive.

Figure 9A:
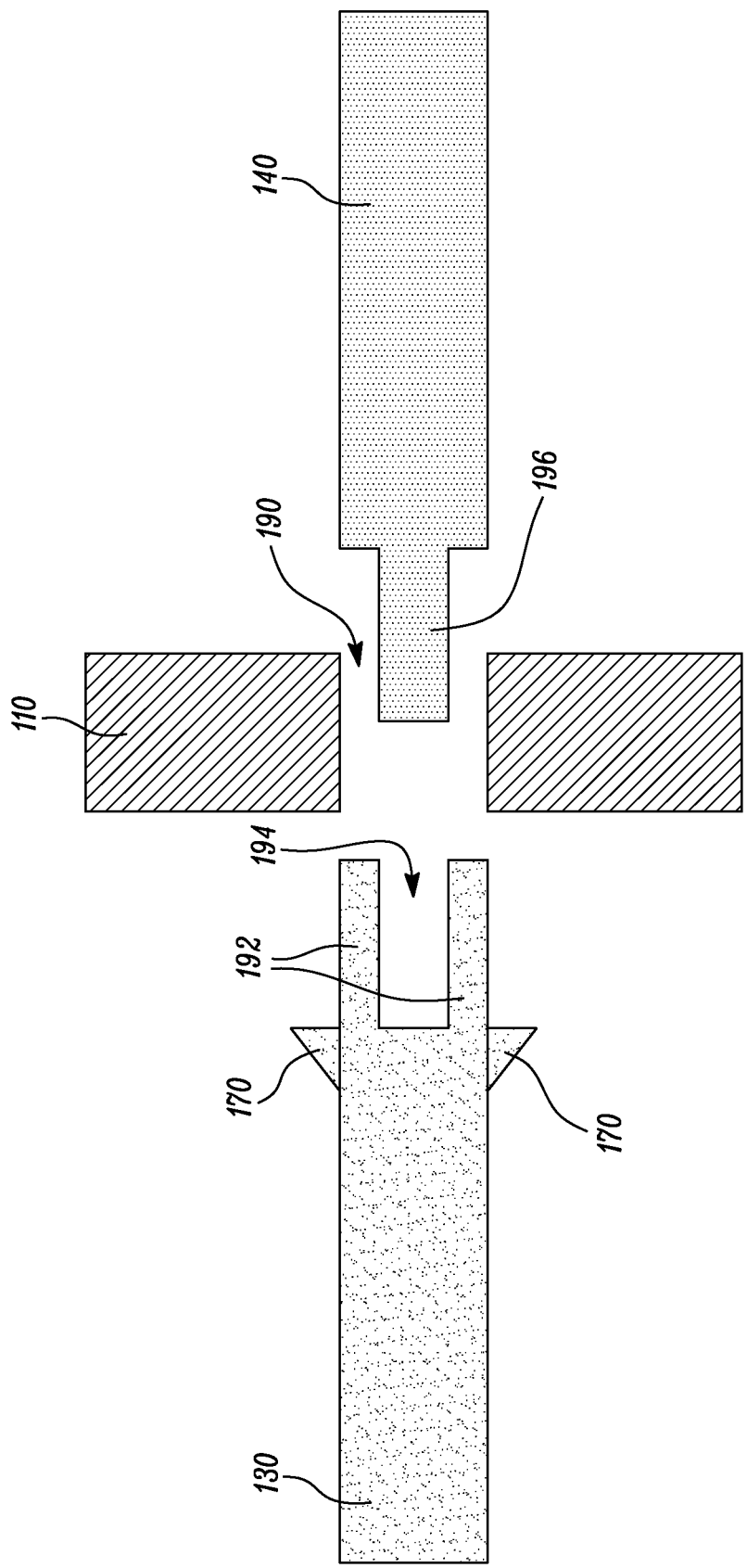
FIG. 9A illustrates a schematic sectional side view of the web, a first vane, and a second vane of the inlet assembly in a disassembled state.
Figure 9B:
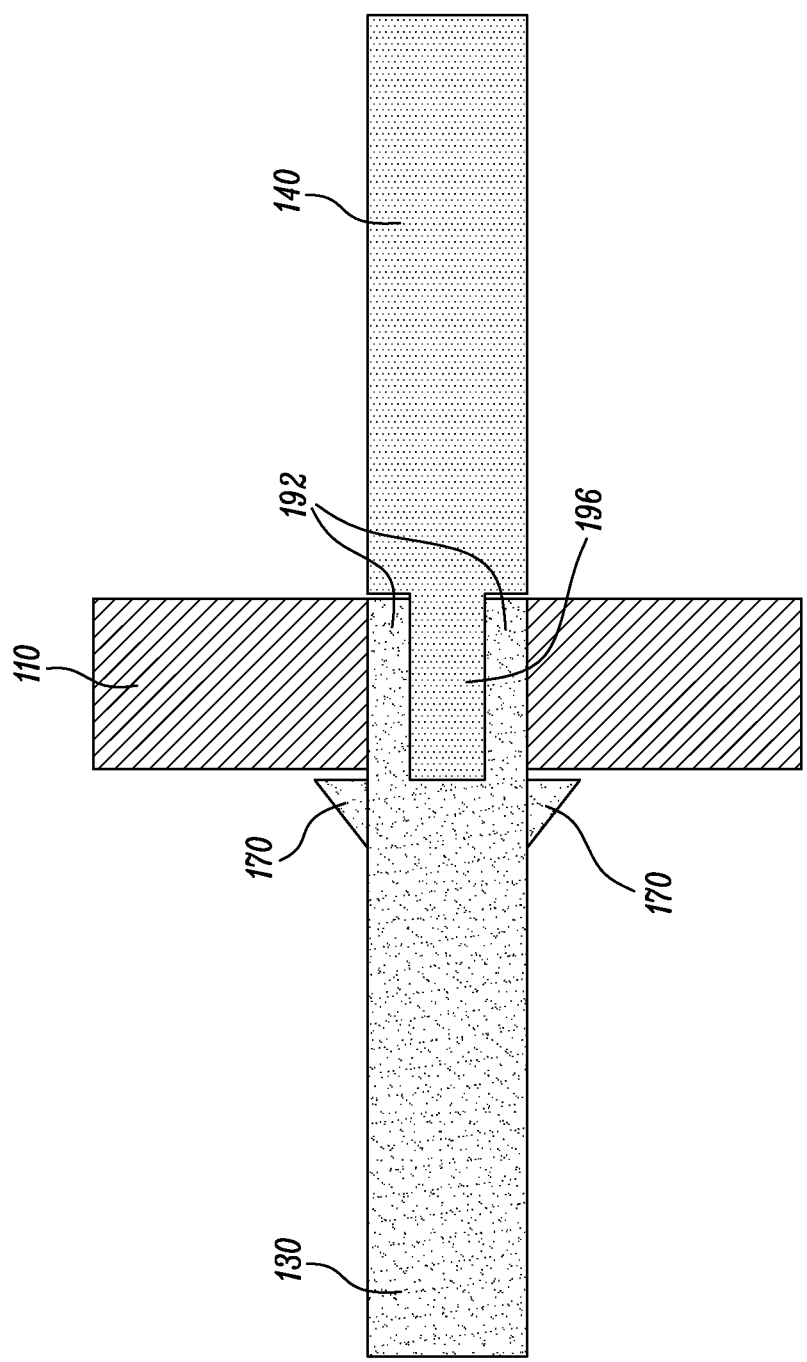
FIG. 9B illustrates a schematic sectional side view of the web, the first vane, and the second vane of the inlet assembly in an assembled state.

FIG. 9A illustrates a schematic sectional side view of the web 110, a first vane 130 from the plurality of first vanes 130, and a second vane 140 from the plurality of second vanes 140 in a disassembled state, according to an embodiment of the present disclosure. FIG. 9B illustrates a schematic sectional side view of the web 110, the first vane 130, and the second vane 140 in an assembled state, according to an embodiment of the present disclosure.

Referring to FIGS. 9A and 9B, in some embodiments, each first vane 130 further includes a pair of first projections 192 defining a first opening 194 therebetween. Further, each second vane 140 includes a second projection 196.

In some embodiments, the pair of first projections 192 of each first vane 130 is at least partially received within the corresponding opening 190 of the web 110. Similarly, the second projection 196 of the opposing second vane 140 is at least partially received within the corresponding opening 190 of the web 110. Further, the second projection 196 is at least partially received within the first opening 194. In other words, the second projection 196 is at least partially received between the pair of first projections 192.

In some embodiments, the inlet assembly 100 (shown in FIG. 3A) includes a plurality of positioning features 170 disposed adjacent to the web 110. The plurality of positioning features 170 extends from each first vane 130 and/or each second vane 140. In the illustrated embodiment of FIG. 9B, the positioning features 170 extend from the first vane 130. However, in some other embodiments, the positioning features 170 may extend from the second vane 140. In some other embodiments, the positioning features 170 may extend from each first vane 130 and each second vane 140.

The plurality of positioning features 170 may ensure that each first vane 130 and/or each second vane 140 are received within the corresponding opening 190 of the web 110 as intended. For example, the plurality of positioning features 170 may ensure that each first vane 130 and/or each second vane 140 are received within the corresponding opening 190 in a correct orientation. The plurality of positioning features 170 may further assist to position, restrict movement, and/or support the plurality of first vanes 130 and/or the plurality of second vanes 140.

Figure 10A:
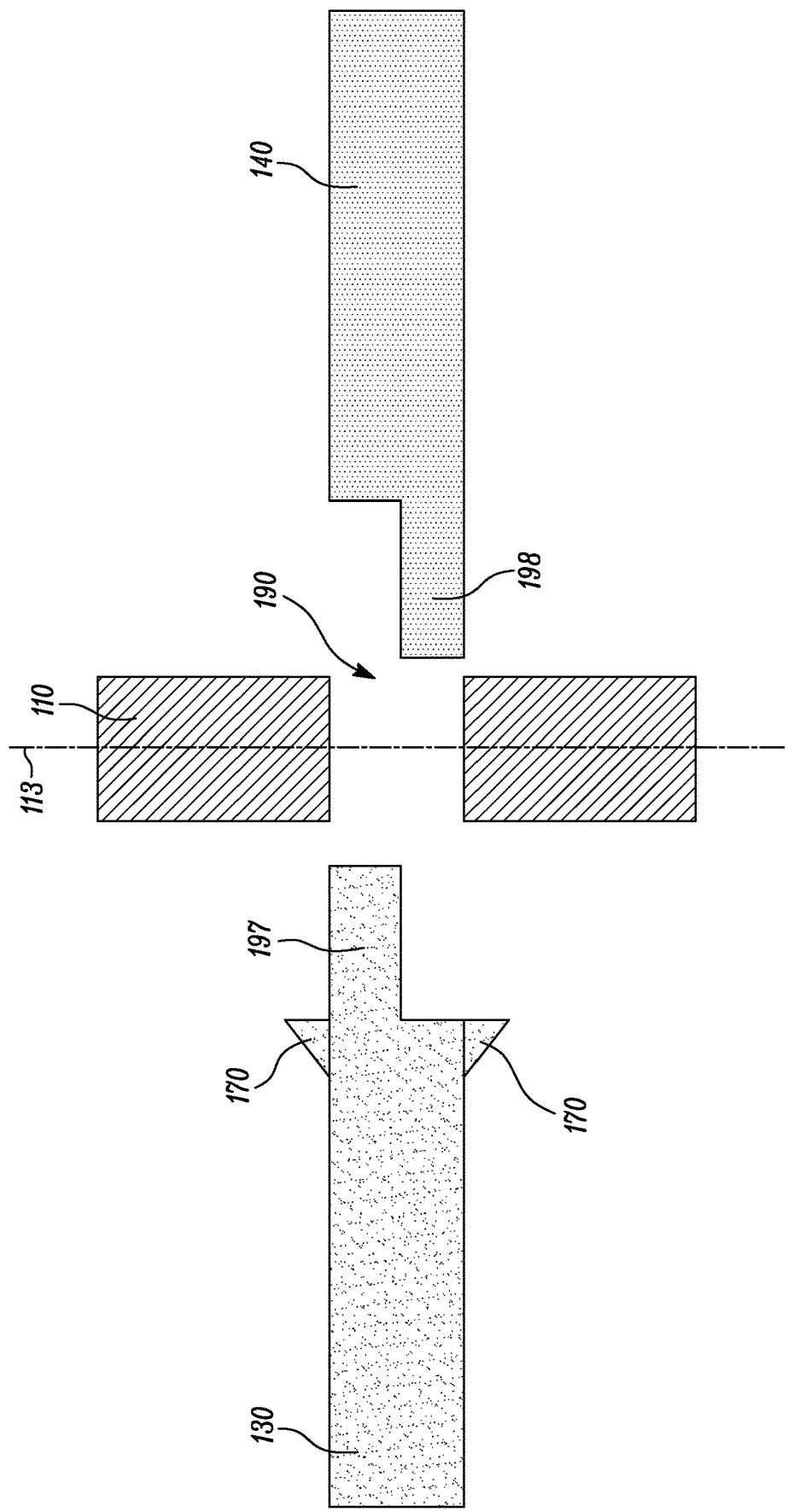
FIG. 10A illustrates a schematic sectional side view of the web, the first vane, and the second vane of the inlet assembly in a disassembled state.
Figure 10B:
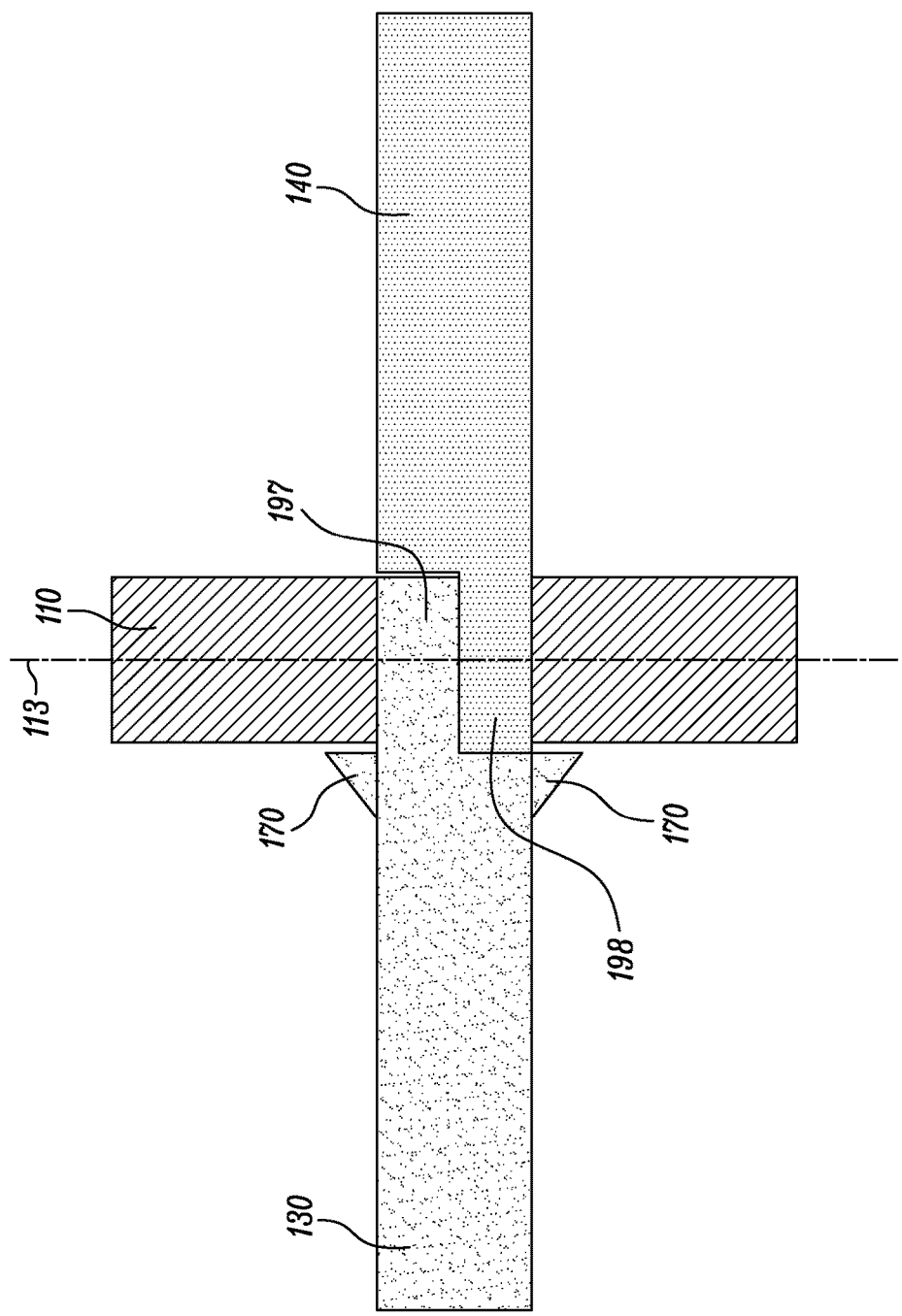
FIG. 10B illustrates a schematic sectional side view of the web, the first vane, and the second vane of the inlet assembly in an assembled state.

FIG. 10A illustrates a schematic sectional side view of the web 110, the first vane 130, and the second vane 140 in a disassembled state, according to another embodiment of the present disclosure. FIG. 10B illustrates a schematic sectional side view of the web 110, the first vane 130, and the second vane 140 in an assembled state, according to another embodiment of the present disclosure.

Referring to FIGS. 10A and 10B, each first vane 130 further includes a first projection 197 and each second vane 140 includes a second projection 198.

In some embodiments, the first projection 197 of each first vane 130 is at least partially received within the corresponding opening 190 of the web 110. Similarly, the second projection 198 of the opposing second vane 140 is at least partially received within the corresponding opening 190 of the web 110.

As is apparent from FIG. 10B, the first projection 197 is offset from the second projection 198 relative to the second axis 113 (also shown in FIG. 3G), such that the first projection 197 at least partially and slidably engages the second projection 198.

Referring to FIGS. 6 to 10B, therefore, the plurality of first vanes 130 and the plurality of second vanes 140 may be securely coupled to the web 110 as intended, such that the plurality of first vanes 130 and the plurality of second vanes 140 have restricted movement, and/or are well-supported by the web 110.

Figure 11:
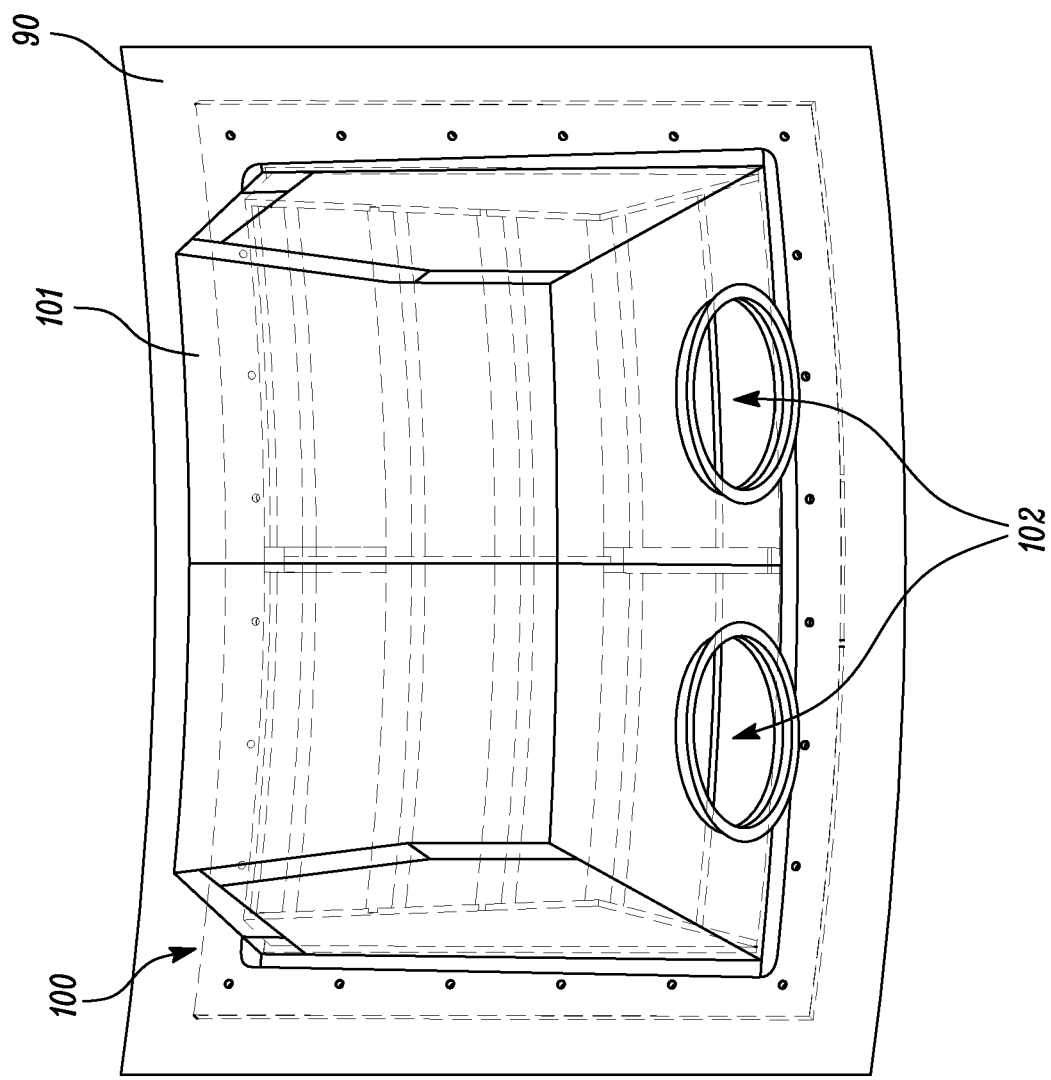
FIG. 11 illustrates a schematic bottom view of the inlet assembly mounted to an inner barrel of the gas turbine engine.

FIG. 11 illustrates a schematic bottom view of the inlet assembly 100 mounted to the inner barrel 90, according to an embodiment of the present disclosure.

As discussed above, the load transfer flange 120 (shown in FIG. 3B) is configured to be fixedly coupled to the gas turbine engine 10 (shown in FIG. 1). In some embodiments, the load transfer flange 120 is configured to be fixedly coupled to the bypass duct 22 (shown in FIG. 1). In some embodiments, the load transfer flange 120 is configured to be fixedly coupled to the inner barrel 90. In some embodiments, the inlet assembly 100 is mounted to the inner barrel 90, such that the load transfer flange 120 is fixedly coupled to the inner barrel 90.

In the illustrated embodiment of FIG. 11, the inlet assembly 100 further includes a plenum 101. The plenum includes one or more outlets 102. The one or more outlets 102 may be coupled with corresponding one or more ducts (not shown).

In some embodiments, a cooling assembly including the inlet assembly 100 may intake the air from the bypass duct 22 (shown in FIG. 1) through inlet assembly 100 mounted on the inner barrel 90 and vent it via the one or more ducts to the engine core 11, a turbine section, air to fluid coolers, oil pumps or fuel pumps, and/or components of cabin bleed systems, such as regulating valves or bypass heat exchangers. In some examples, the bypass heat exchangers include a matrix cooler. The matrix cooler may include an oil/air, air/fuel, air/air, and/or air/refrigerant matrix cooler. In some examples, the cooling assembly may be used for cooling a turbine casing of the high pressure turbine 17 (shown in FIG. 1) or the low pressure turbine 19 (shown in FIG. 1).

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An inlet assembly for a gas turbine engine, the inlet assembly comprising:
   a web extending between a first end and a second end along a first axis, the web comprising a first major surface and a second major surface opposite to the first major surface, each of the first major surface and the second major surface extending at least along the first axis and a second axis orthogonal to the first axis;
   a load transfer flange at least partially disposed around the web and configured to be fixedly coupled to the gas turbine engine;
   a plurality of first vanes spaced apart from each other at least along the first axis and defining a plurality of first inlet passages therebetween, wherein each first vane from the plurality of first vanes extends between the first major surface of the web and the load transfer flange at least along a third axis orthogonal to each of the first axis and the second axis, and wherein each first vane is fixedly coupled to the web and the load transfer flange;
   a plurality of second vanes spaced apart from each other at least along the first axis and defining a plurality of second inlet passages therebetween, wherein each second vane from the plurality of second vanes extends between the second major surface of the web and the load transfer flange at least along the third axis, and wherein each second vane is fixedly coupled to the web and the load transfer flange;
   a first support structure disposed opposite to the first major surface of the web and connected to each first vane, the first support structure coupling each first vane to the load transfer flange;
   a second support structure disposed opposite to the second major surface of the web and connected to each second vane, the second support structure coupling each second vane to the load transfer flange;
   wherein the first support structure comprises:
      a first plate opposing the first major surface of the web and connected to each first vane; and
      a first flange connected to the first plate and extending from the first plate opposite to the first major surface, the first flange coupling each first vane to the load transfer flange;
      a first foremost flange coupling the first plate to the load transfer flange; and
      a first rearmost flange spaced apart from the first foremost flange along the first axis and coupling the first plate to the load transfer flange;
   wherein the second support structure comprises:
      a second plate opposing the second major surface of the web and connected to each second vane; and
      a second flange connected to the second plate and extending from the second plate opposite to the second major surface, the second flange coupling each second vane to the load transfer flange a second foremost flange spaced apart from the first foremost flange along the third axis and coupling the second plate to the load transfer flange; and a second rearmost flange spaced apart from the first rearmost flange along the third axis and coupling the second plate to the load transfer flange; and wherein the first plate defines a plurality of first openings and the first flange comprises a plurality of first projections corresponding to the plurality of first openings, such that each of the plurality of first openings at least partially receives a corresponding first projection from the plurality of first projections therein to connect the first flange to the first plate, and wherein the second plate defines a plurality of second openings and the second flange comprises a plurality of second projections corresponding to the plurality of second openings, such that each of the plurality of second openings at least partially receives a corresponding second projection from the plurality of second projections therein to connect the second flange to the second plate.

2. The inlet assembly of claim 1, wherein the plurality of first openings extends along a first line obliquely inclined to the first axis, and wherein the plurality of second openings extends along a second line obliquely inclined to the first axis.

3. The inlet assembly of claim 1, wherein the web further comprises:

a foremost flange disposed proximal to the first end and coupling the web to the load transfer flange; and a rearmost flange disposed proximal to the second end and coupling the web to the load transfer flange.

4. The inlet assembly of claim 3, wherein the load transfer flange defines a plurality of first apertures extending therethrough, and wherein each of the first foremost flange, the first rearmost flange, the second foremost flange, the second rearmost flange, the first flange, the second flange, the foremost flange, and the rearmost flange defines a plurality of second apertures extending therethrough and aligned with at least some of the plurality of first apertures for at least partially receiving corresponding fasteners therein.

5. The inlet assembly of claim 4, wherein each of the first foremost flange, the first rearmost flange, the second foremost flange, the second rearmost flange, the first flange, the second flange, the foremost flange, and the rearmost flange comprises a plurality of inserts corresponding to the plurality of second apertures, wherein each insert from the plurality of inserts is at least partially received in a corresponding second aperture from the plurality of first apertures, and wherein a material of each insert is different from a material of each of the first foremost flange, the first rearmost flange, the second foremost flange, the second rearmost flange, the first flange, the second flange, the foremost flange, and the rearmost flange.

* * * * *